(12) United States Patent
Kamire et al.

(10) Patent No.: US 11,292,600 B2
(45) Date of Patent: Apr. 5, 2022

(54) AIRCRAFT CABIN CONTAMINANT REMOVAL USING LIQUID SORBENT

(71) Applicant: Honeywell International Inc., Morris Plains, NJ (US)

(72) Inventors: Rebecca Kamire, Buffalo Grove, IL (US); Phoebe Henson, Scottsdale, AZ (US); Peter M. Michalakos, Arlington Heights, IL (US); Jan Ludvik, Jesenice (CZ)

(73) Assignee: Honeywell International Inc., Charlotte, NC (US)

( * ) Notice: Subject to any disclaimer, the term of this patent is extended or adjusted under 35 U.S.C. 154(b) by 298 days.

(21) Appl. No.: 16/551,368

(22) Filed: Aug. 26, 2019

(65) Prior Publication Data
US 2021/0061475 A1 Mar. 4, 2021

(51) Int. Cl.
*B01D 53/14* (2006.01)
*B64D 13/06* (2006.01)
(Continued)

(52) U.S. Cl.
CPC ............. *B64D 13/06* (2013.01); *B01D 53/14* (2013.01); *B01D 53/1412* (2013.01);
(Continued)

(58) Field of Classification Search
CPC ... B01D 53/229; B01D 53/14; B01D 53/1425
See application file for complete search history.

(56) References Cited

U.S. PATENT DOCUMENTS 3,276,679 A 10/1966 Booth
4,362,540 A 12/1982 Strahsner
(Continued)

FOREIGN PATENT DOCUMENTS

DE 19545335 A1 * 6/1997 .......... B01D 53/229
EP 2685190 A1 1/2014
(Continued)

OTHER PUBLICATIONS

Modekurti, et al., "Design, dynamic modeling, and control of a multistage CO2 compression System," International Journal of Greenhouse Gas Control, Jul. 2017, accepted Mar. 9, 2017, pp. 31-45.
(Continued)

*Primary Examiner* — Robert A Hopkins
(74) *Attorney, Agent, or Firm* — Shumaker & Sieffert, P.A.

(57) ABSTRACT

An aircraft contaminant removal system includes one or more membrane separators configured to absorb a contaminant from a cabin air stream into a liquid sorbent, desorb the contaminant from the liquid sorbent, discharge the contaminant in a contaminant stream, and return clean air back to the cabin. In some examples, the contaminant removal system includes a membrane scrubber-separator and a membrane stripper-separator, while in other examples, the contaminant removal system may include a single membrane separator configured to operate in a scrubbing mode and a stripping mode. The contaminant removal system may include a humidity management system configured to maintain a humidity of the clean air stream or water concentration of the liquid sorbent using one or more water sources of the aircraft or a thermal management system configured to maintain a temperature of the liquid sorbent using one or more heat exchangers fluidically coupled to an aircraft air stream.

20 Claims, 12 Drawing Sheets

(51) Int. Cl.
   *B01D 53/18* (2006.01)
   *B01D 53/22* (2006.01)
(52) U.S. Cl.
   CPC ..... *B01D 53/1418* (2013.01); *B01D 53/1425* (2013.01); *B01D 53/18* (2013.01); *B01D 53/229* (2013.01); *B01D 2252/30* (2013.01); *B01D 2311/2626* (2013.01); *B64D 2013/0662* (2013.01); *B64D 2013/0674* (2013.01)

(56) References Cited

U.S. PATENT DOCUMENTS

| | | | |
|---|---|---|---|
| 4,452,676 | A | 6/1984 | Birbara et al. |
| 5,250,091 | A | 10/1993 | Nigsch et al. |
| 5,352,272 | A | 10/1994 | Moll et al. |
| 6,619,054 | B1 | 9/2003 | Cargnelli et al. |
| RE39,122 | E | 6/2006 | Henderson et al. |
| 8,647,409 | B2 | 2/2014 | Hashi et al. |
| 10,072,239 | B1 | 9/2018 | Berberoglu et al. |
| 11,034,212 | B2 * | 6/2021 | Li ........................... B60H 1/008 |
| 2006/0225386 | A1 | 10/2006 | Brouwers et al. |
| 2009/0075219 | A1 | 3/2009 | Vilagines et al. |
| 2010/0279181 | A1 | 11/2010 | Adams, II et al. |
| 2010/0279191 | A1 | 11/2010 | Matsuura et al. |
| 2010/0288121 | A1 | 11/2010 | Antonio et al. |
| 2012/0009109 | A1 | 1/2012 | Wright et al. |
| 2012/0153514 | A1 | 6/2012 | Baxter et al. |
| 2012/0183457 | A1 | 7/2012 | MacCallum |
| 2012/0291630 | A1 | 11/2012 | Paragano et al. |
| 2014/0033747 | A1 | 2/2014 | Stallmann et al. |
| 2014/0161698 | A1 | 6/2014 | Klimpel et al. |
| 2014/0326428 | A1 | 11/2014 | Meirav et al. |
| 2015/0104290 | A1 | 4/2015 | Dickson et al. |
| 2018/0056233 | A1 | 3/2018 | Henson et al. |
| 2018/0056234 | A1 | 3/2018 | Weng et al. |
| 2018/0243682 | A1 | 8/2018 | Isobe et al. |
| 2018/0243685 | A1 | 8/2018 | Henson et al. |
| 2018/0265993 | A1 | 9/2018 | Kamire et al. |
| 2019/0047721 | A1 | 2/2019 | Rheaume et al. |

FOREIGN PATENT DOCUMENTS

| | | | |
|---|---|---|---|
| EP | 3366365 | A1 | 8/2018 |
| WO | 2011010111 | A2 | 1/2011 |
| WO | 2016108731 | A1 | 7/2016 |

OTHER PUBLICATIONS

Tegrotenhuis et al., "Normal Gravity Testing of a Microchannel Phase Separator for Insitu Resource Utilization," NASA/CR—2001-210955, Jun. 2001, 24 pp.

"A Preliminary Assessment of Phase Separator Ground-Based and Reduced-Gravity Testing for ALS Systems," NASA, Feb. 2006, 25 slides.

Ellis, "The Tangential Velocity Profile and Momentum Transfer within a Microgravity Vortex Separator," Submitted to the Office of Graduate Studies of Texas A & M, Dec. 2006, 146 pp.

Kang, "Investigation of Passive Cyclonic Gas-Liquid Separator Performance for Microgravity Applications," Department of Mechanical and Aerospace Engineering, Case Western Reserve University, Jan. 2017, 168 pp.

Thomas et al., "Development of the Static Phase Separator," NASA—Johnson Space Center, SAE International, Jan. 2008, 8 pp.

Matteau et al., "A Two-Phase Fluid Pump for Use in Microgravity Environments," AlliedSignal Aerospace, Society of Automotive Engineers, Jul. 1999, 8 pp.

Yates et al., "A Closed-Loop CO2 and Humidity Recovery System for Deep Space Missions," 47th International Conference on Environmental Systems, ICES, Jul. 16-20, 2017, 16 pp.

U.S. Appl. No. 16/164,461, by Honeywell International, Inc. (Inventors: Henson et al.), filed Oct. 18, 2018.

Partial European Search Report from counterpart Application No. 20189063.9, dated Jan. 22, 2021, 12 pp.

Wu et al., "Development of a passive phase separator for space and earth Applications," Journal of Separation and Purification Technology, Elsevier, published online Aug. 7, 2017, 9 pp.

Office Action from U.S. Appl. No. 16/164,461, dated Mar. 16, 2021, 22 pp.

Extended Search Report from counterpart European Application No. 20189063.9, dated May 3, 2021, 10 pp.

Response to Office Action dated Mar. 16, 2021, from U.S. Appl. No. 16/164,461, filed Jun. 16, 2021, 14 pp.

Response to Extended Search Report dated May 3, 2021, from counterpart European Application No. 20189063.9, filed Jun. 7, 2021, 46 pp.

Notice of Allowance from U.S. Appl. No. 16/164,461, dated Aug. 18, 2021, 13 pp.

* cited by examiner

AIRCRAFT CABIN CONTAMINANT REMOVAL USING LIQUID SORBENT

TECHNICAL FIELD

The present disclosure relates to systems and techniques for removing contaminants from air using contaminant removal systems.

BACKGROUND

An environmental control system (ECS) of an aircraft may provide pressurized air to an aircraft cabin. A portion of this pressurized air may be bleed air supplied from an engine of the aircraft or compressed air supplied from dedicated cabin air compressors, while a remainder of the pressurized air may be recirculated air from the aircraft cabin. To reduce a load on the engine and corresponding fuel consumption, the portion of the pressurized air from bleed air or compressed air may be reduced and the portion of pressurized air that is recirculated increased. However, the portion of the pressurized air that is recirculated from the aircraft cabin may be limited by the presence of contaminants in the recirculated air. For example, cabin air may include relatively high concentrations of carbon dioxide and volatile hydrocarbons which may be uncomfortable for occupants at low concentrations and toxic to occupants at high concentrations. As a result, the cabin air may be continually replaced with a higher proportion of costly bleed air or compressed air than may be necessary to maintain a pressure or temperature of the aircraft cabin.

SUMMARY

The disclosure describes systems and techniques for removing contaminants from an aircraft cabin using a liquid sorbent and discharging the contaminants from the aircraft. Rather than discharge the contaminated pressurized cabin air directly off the aircraft, a contaminant removal system may treat the contaminant-containing cabin air using one or more membrane separators to absorb contaminants from the cabin air into a liquid sorbent and desorb the contaminants from the liquid sorbent into a contaminant stream. Some desorbed contaminants, such as carbon dioxide, may be discharged off the aircraft while other components, such as water, may be removed from the contaminant stream and returned to the cabin air, the liquid sorbent, or another system on the aircraft. In some instances, other systems or fluid streams of the aircraft may be integrated into the cabin air and/or liquid sorbent circuits to further increase effectiveness of the contaminant removal system and/or reduce a load on an environmental control system. In this way, a portion of pressurized air from bleed air may be reduced without compromising occupant safety or comfort.

In some examples, the disclosure describes an aircraft contaminant removal system that includes a membrane scrubber-separator, a membrane stripper-separator, and a humidity management system. The membrane scrubber-separator is configured to receive a cabin air stream from a cabin of an aircraft, absorb a contaminant from the cabin air stream into a liquid sorbent, and discharge a clean air stream. The membrane stripper-separator is configured to desorb the contaminant from the liquid sorbent and discharge the contaminant in a contaminant stream. The humidity management system is configured to maintain a humidity of the clean air stream or a water concentration of the liquid sorbent using one or more water sources of the aircraft.

In some examples, the disclosure describes an aircraft contaminant removal system configured to operate in a scrubbing mode and a stripping mode, and that includes a membrane separator. In the scrubbing mode, the membrane separator is configured to receive a cabin air stream from a cabin of an aircraft, absorb a contaminant from the cabin air stream into a liquid sorbent, and discharge a clean air stream. In a stripping mode, the membrane separator is configured to receive an external air stream, desorb the contaminant from the liquid sorbent using the external air stream, and discharge the contaminant in a contaminant stream.

In some examples, the disclosure describes an aircraft contaminant removal system that includes a membrane scrubber-separator, a membrane stripper-separator, and a thermal management system. The membrane scrubber-separator is configured to receive a cabin air stream from a cabin of an aircraft, absorb a contaminant from the cabin air stream into a liquid sorbent, and discharge a clean air stream. The membrane stripper-separator is configured to desorb the contaminant from the liquid sorbent and discharge the contaminant in a contaminant stream. The thermal management system is configured to maintain a temperature of the liquid sorbent using one or more heat exchangers fluidically coupled to an aircraft air stream.

In some examples, the disclosure describes for an aircraft contaminant removal system configured to receive a contaminant concentration measurement for a contaminant from the contaminant removal system. The contaminant removal system is configured to receive a cabin air stream from a cabin of an aircraft, absorb the contaminant from the cabin air stream using a liquid sorbent, desorb the contaminant from the liquid sorbent, discharge a clean air stream to the cabin, and discharge a contaminant stream that includes the contaminant from the aircraft. The controller is further configured to determine whether the contaminant concentration measurement exceeds a contaminant concentration setpoint and send, in response to the contaminant concentration measurement exceeding the contaminant concentration setpoint, a control signal to decrease a concentration of the contaminant in the clean air stream.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
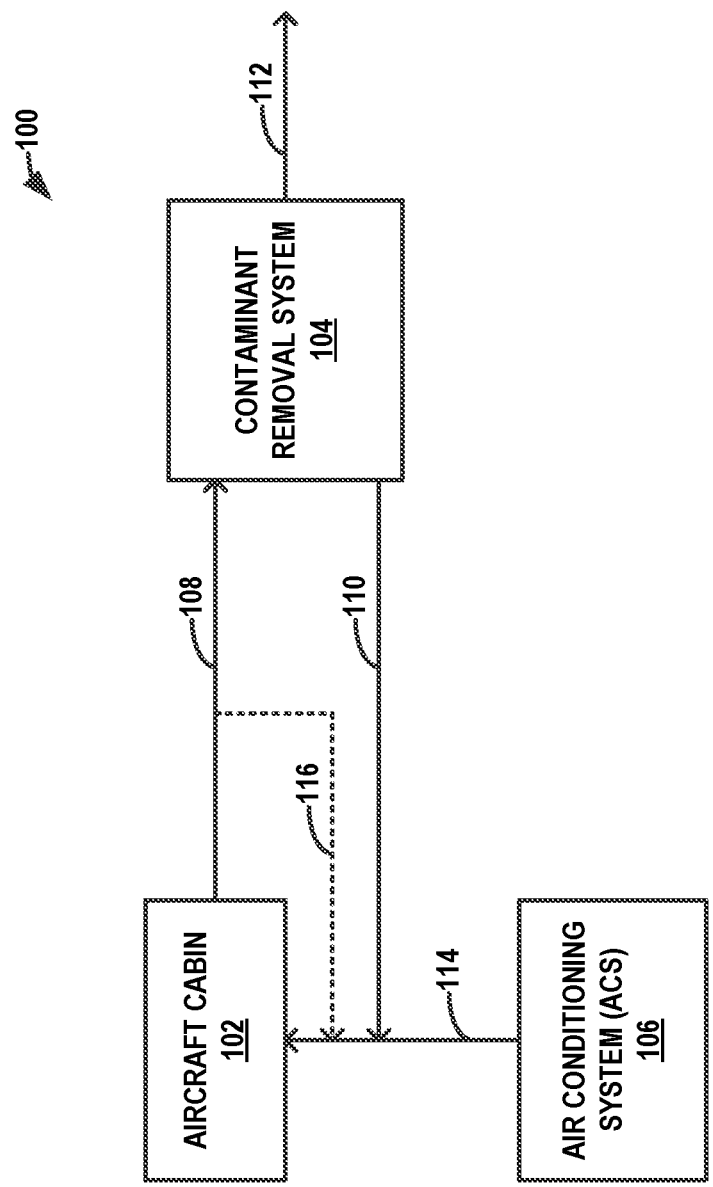
FIG. 1 is a diagram illustrating an example environmental control system that includes a contaminant removal system for removing contaminants from an aircraft cabin using a liquid sorbent and discharging the contaminants from the aircraft.

Contaminant removal systems described herein may be utilized as part of an environmental control system (ECS) of an aircraft. FIG. 1 is a diagram illustrating an example ECS 100 for maintaining an environment of an aircraft cabin 102. ECS 100 includes aircraft cabin 102, a contaminant removal system 104, and an air conditioning system (ACS) 106. ACS 106 is configured to supply cooled, pressurized air to cabin 102 as a conditioned air stream 114. For example, ACS 106 may receive hot, pressurized bleed air from an engine of the aircraft or compressed air from cabin air compressors and condition the bleed air or compressed air to produce cool, pressurized air for use in cabin 102. ECS 100 may include a contaminant removal system bypass stream 116 configured to bypass a portion of the cabin air from cabin air stream 108 around contaminant removal system 104.

In embodiments discussed herein, contaminant removal system 104 is configured to remove contaminants from cabin air using liquid sorbent and discharge the removed contaminants from the aircraft. Contaminant removal system 104 may receive contaminated cabin air from cabin 102 as a cabin air stream 108, discharge clean air as a clean air stream 110, and discharge contaminants in a contaminant stream 112. As a result of treatment by contaminant removal system 104, clean air from clean air stream 110 may have a lower concentration of contaminants than cabin air from cabin air stream 108. Further operation of contaminant removal system 104 will be described through various embodiments illustrated in FIGS. 2-8.

In some examples, ECS 100 may be configured to control a composition of clean cabin air into cabin 102 by modifying a combination of conditioned air from conditioned air stream 114, treated clean air from clean air stream 110, and untreated cabin air from cabin air stream 108 via contaminant removal system bypass stream 116. For example, each of conditioned air stream 114, clean air stream 110, and contaminant removal system bypass stream 116 may have a different measured concentration of contaminants, temperature, and pressure, while cabin 102 may have a target contaminant concentration, temperature, and pressure. ACS 106 may produce relatively cool and pressurized conditioned air stream 114 at a relatively high energy cost compared to clean air stream 110 produced by contaminant removal system 104, while ECS 100 may produce relatively warm and contaminated (but still pressurized) contaminant removal bypass stream 116 at a relatively low energy cost compared to clean air stream 110 produced by contaminant removal system 104. As such, a mix of these streams may produce clean cabin air that is within the target contaminant concentration, temperature, and pressure, while using less energy than if all the clean cabin air was supplied by conditioned air stream 114 and/or clean air stream 110.

In some examples, ECS 100 may include a manifold (not shown) configured to receive cooled and pressurized conditioned air stream 114, clean air stream 110, and contaminant removal bypass stream 116, and control the flow rates of conditioned air stream 114, clean air stream 110, and/or contaminant removal bypass stream 116 to achieve (e.g., maintain below a threshold or within a threshold range) the target contaminant concentration, temperature, and pressure of cabin 100. For example, ECS 100 may supply conditioned air stream 110 at a flow rate sufficient to maintain a pressure and temperature below a pressure and temperature threshold, supply clean air stream 110 at a flow rate sufficient to maintain a concentration of contaminants below a concentration of contaminants threshold, and supply a remainder of cabin air from cabin air stream In this way, ECS 100 may provide adequately conditioned air to cabin 102 for a variety of operating conditions with reduced energy cost compared to air supplied from only conditioned air stream 114 or only a mixture of conditioned air stream 114 and clean air stream 110.

Figure 2:
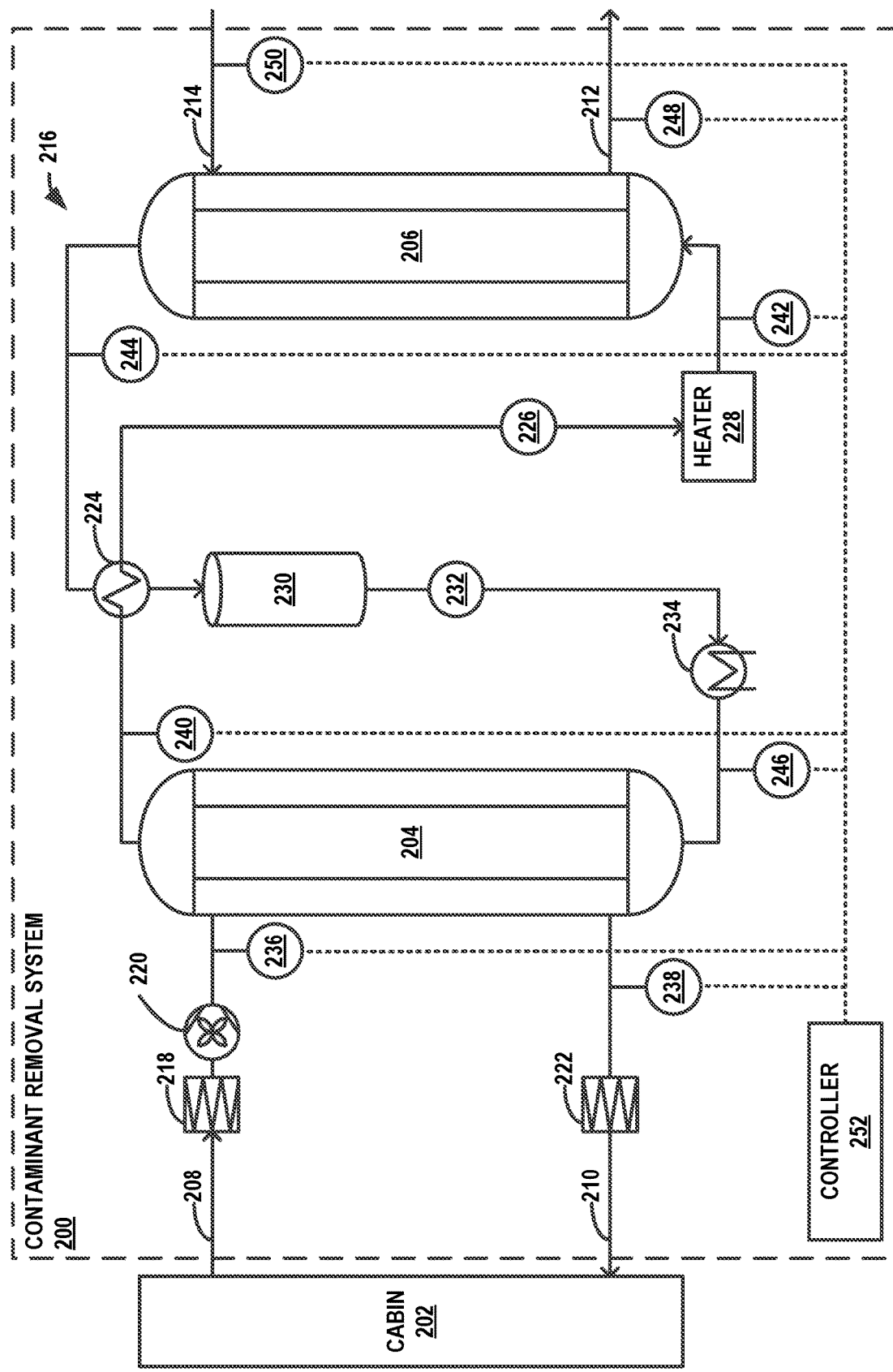
FIG. 2 is a diagram illustrating an example contaminant removal system for removing contaminants from an aircraft cabin using a liquid sorbent with a membrane scrubber-separator and a membrane stripper-separator.

In some embodiments of contaminant removal systems discussed herein, contaminants may be removed from an aircraft cabin and discharged from the aircraft using at least one membrane scrubber-separator and at least one membrane stripper-separator. For example, two membrane separators connected in series may form a liquid sorbent circuit that is capable of continuous scrubbing of contaminants from the cabin air in a first membrane separator to produce clean air and stripping of the contaminants from the used liquid sorbent in a second membrane separator to discharge the contaminants. FIG. 2 is a diagram illustrating an example contaminant removal system 200 for removing contaminants from an aircraft cabin 202 using a liquid sorbent with a membrane scrubber-separator 204 and a membrane stripper-separator 206.

Contaminant removal system 200 includes connections to systems outside contaminant removal system 200, including cabin 202, a cooling system (not shown) for various heat transfer components, and an atmosphere outside the aircraft. Contaminant removal system 200 includes an inlet configured to receive cabin air stream 208 from cabin 202 and an outlet configured to discharge clean air stream 210 to cabin 202. Clean air stream 210 has a contaminant concentration that is lower than cabin air stream 208. Clean air stream 210 may still include contaminants, though the contaminants would be below a threshold level for each contaminant. Contaminant removal system 200 includes an overboard outlet configured to discharge a contaminant stream 212 from the aircraft. In the example of FIG. 2, contaminant removal system 200 includes a sweep gas inlet configured to receive a sweep gas stream 214; however, in other examples, sweep gas stream 214 may be omitted, such as in examples in which a vacuum may draw away contaminant stream 212.

Contaminant removal system 200 includes a cabin air circuit configured to circulate cabin air between cabin 202 and scrubber-separator 204. In the example of FIG. 2, cabin air stream 208 includes a filter 218 configured to remove particulates from cabin air stream 208 prior to entry into scrubber-separator 204 and a blower 220 configured to draw cabin air into scrubber-separator 204. In the example of FIG. 2, clean air stream 210 includes a filter 222 configured to remove any leaked liquid sorbent and/or further filter clean air from clean air stream 210 prior to entry into cabin 202. Clean air stream 208 may have a concentration of a contaminant that is about 25% to about 99% less than a concentration of the contaminant in cabin air stream 208. In some examples, cabin air stream 208 may have a carbon dioxide concentration between about 1000 ppm and about 5000 ppm and/or a hydrocarbon concentration between about 1 ppb and about 100 ppb.

Contaminant removal system 200 includes a liquid sorbent circuit 216 configured to circulate liquid sorbent between scrubber-separator 204 and stripper-separator 206. For example, a pump 232 may pump clean liquid sorbent from a clean liquid sorbent storage 230 into scrubber-separator 204, while pump 226 may pump used liquid sorbent from scrubber-separator 204 to stripper-separator 206. Clean liquid sorbent may include unused liquid sorbent free of contaminants or regenerated liquid sorbent having a lower concentration of contaminants than the used liquid sorbent. In some examples, the clean liquid sorbent may be cooled by a cooler 234 prior to entry into scrubber-separator 204. In some examples, the used liquid sorbent may be preheated by a heat exchanger 224 prior to entry into stripper-separator 206. As will be discussed in FIGS. 8A-8C below, cooler 234 and/or heat exchanger 224 may be coupled to various aircraft fluid streams, such as sweep gas streams or heating/cooling circuits of other aircraft systems.

Contaminant removal system 200 includes scrubber-separator 204. On a gas phase side, scrubber-separator 204 is configured to receive cabin air from cabin air stream 208. Cabin air from cabin air stream 208 includes contaminants from cabin 202, such as carbon dioxide, water, hydrocarbon volatiles, and other gaseous substances. Scrubber-separator 204 is configured to absorb one or more contaminant species in the cabin air from cabin air stream 208 into a liquid sorbent. Scrubber-separator 204 includes one or more separation membranes, each configured to flow (e.g., provide or direct flow of) cabin air from cabin air stream 208 on a gas phase side (e.g., a shell side) of the respective membrane and flow a liquid sorbent on a liquid phase side (e.g., a tube side) of the membrane. Contaminants, such as carbon dioxide and water, may flow across fibers of the membrane due to a concentration gradient and become absorbed by the liquid sorbent, while the liquid sorbent may not substantially flow across the fibers of the membrane. As a result, clean air discharged from scrubber-separator 204 may have a lower concentration of contaminants than cabin air received by scrubber-separator 204. Scrubber-separator 204 is configured to discharge a clean air stream 210 to cabin 202. On a liquid phase side, scrubber-separator 204 is configured to receive clean liquid sorbent. The clean liquid sorbent may flow through scrubber-separator 204 and absorb contaminants from cabin air of cabin air stream 208 through the membrane(s) of scrubber-separator 204. As a result, the used liquid sorbent discharged from scrubber-separator 204 may have a higher concentration of contaminants than the clean liquid sorbent received by scrubber-separator 204. Scrubber-separator 204 may discharge the used liquid sorbent containing the contaminants to stripper-separator 206.

Contaminant removal system 200 includes stripper-separator 206. On a liquid phase side, stripper-separator 206 is configured to receive used liquid sorbent from scrubber-separator 204 and desorb one or more contaminants from the used liquid sorbent. Stripper-separator 206 includes one or more membranes, each configured to flow the used liquid sorbent on one side (e.g., a tube side) of the membrane and contaminated air to a contaminant stream 212 on an opposite side (e.g., a shell side) of the membrane. Contaminants may flow across fibers of the membrane due to a concentration gradient, while the liquid sorbent may not substantially flow across the fibers of the membrane. As a result, clean liquid sorbent discharged from stripper-separator 206 may have a lower concentration of contaminants than the used liquid sorbent received by stripper-separator 206. On a gas phase side, stripper-separator 206 is configured to discharge the contaminant in a contaminant stream 212. Contaminant stream 212 may be continuously removed from stripper-separator 206 to assist migration of the contaminants from the used liquid sorbent into contaminant stream 212.

In some examples, stripper-separator 206 may be configured to utilize conditions of the aircraft to increase desorption of contaminants from the used liquid sorbent in stripper-separator 206. For example, desorption of contaminants from the used liquid sorbent may be increased by decreasing a partial pressure of contaminant gases on the gas phase side to create a driving force for the contaminants to desorb from the used liquid sorbent and migrate into contaminant stream 212. Contaminant removal system 200 may decrease the partial pressure by providing a vacuum or sweep gas to stripper-separator 206. For example, a sweep gas may be an inert gas used to create a partial pressure gradient on the gas phase side of the membrane of stripper-separator 206 to drive removal of contaminants from the liquid sorbent into contaminant stream 212. In the example of FIG. 2, stripper-separator 206 is fluidically coupled to a sweep gas stream 214 configured to supply a sweep gas to stripper-separator 206. In some examples, stripper-separator 206 is configured to desorb the contaminant using a ram air stream as a sweep gas stream 214. For example, ram air from outside the aircraft may remove desorbed contaminants from the membrane to maintain a low concentration of contaminants at the membrane to increase a rate of desorption of the contaminants from the used liquid sorbent. As another example, during flight, a pressure of the atmosphere outside the aircraft may be low, creating a vacuum on stripper-separator 206 to increase a rate of desorption of the contaminants from the used liquid sorbent without a sweep gas stream. In these various ways, conditions and fluid streams specific to aircraft operation, such as use of ram air as a sweep gas and altitude-based pressure difference as a vacuum, may assist in contaminant removal from stripper-separator 206.

Membrane separators discussed herein, such as scrubber-separator 204 and stripper-separator 206, may include one or more membrane contactors configured to flow air on a first side and liquid sorbent on a second, opposite side. For example, a membrane separator may include a plurality of parallel membrane contactors. In some examples, a membrane contactor may include a cylindrical module filled with parallel or woven hollow porous fibers. For example, dimensions of these hollow fibers could be less than about 3 mm, and the pore dimension could be less than about 2 microns. The high surface area of the hollow fiber membrane contactors enables a high mass transfer of contaminants from cabin air stream 208, such as carbon dioxide and water, into the liquid sorbent using a relatively small system volume and weight. In some examples, baffles or other structures, such as threads or other fibers, may also be present between the fibers, between the fibers and the outer shell, or perpendicular to fibers to improve mixing of the fluid on the shell side. In some examples, flow on the shell side may be swirled or turbulated using duct bends prior to entry into the membrane module and/or angling flow entry vector into the module and/or using guide vanes or similar structures to enhance mass transfer across the membrane. Ports on ends of the modules may connect to a manifold (e.g., a "tube sheet") allowing fluid flow from the ports through the bore of each fiber and hence to the opposing port. Additional ports may access the shell-side at opposite ends of the module, allowing fluid flow on the outside of the fibers through the module. The material of the hollow fibers can be selected such that the liquid sorbent does not wet the pores, and the trans-membrane pressure is kept sufficiently low to prevent pore penetration. As a result, the membrane contactor may ensure that the liquid sorbent and gas stream do not need further separation, such that contaminant removal system 200 may act in a relatively gravity-independent way without the use of moving parts. Fiber materials may include, but are not limited to, hydrophobic materials such as polypropylene, polyvinylidene fluoride, polysulfone, polyimide, polytetrafluoroethylene (PTFE), and the like. In some examples, a coating may be applied to reduce liquid flow through the pores. Coatings that may be used include, but are not limited to, PTFE, a crosslinked siloxane, and the like to prevent liquid flow through the pores. While described in FIG. 2 as flowing through a "tube" side, liquid sorbent flow can be either on the "tube" side or the "shell" side, while air is flowed on the opposite side.

In some examples, the liquid sorbent may be a liquid ionic sorbent. Such liquid ionic sorbents may be salts that are generally comprised of an anion and organic cation. These salts may be liquid at their temperature of use, have effectively zero vapor pressure, be generally nontoxic, and/or have sufficient stability to resist deterioration. In some examples, liquid sorbents may contain relatively large organic cations and any of a variety of anions, which may be tailored to obtain desired characteristics. Liquid sorbents may be water soluble, hygroscopic (i.e., capable of absorbing moisture from the air), and/or capable of releasing water by evaporation, such as by elevating the temperature or reducing the water partial pressure.

Contaminant removal system 200 may include a process control system that includes a controller 252 and one or more sensor sets 236, 238, 240, 242, 244, 246, 248, 250. Controller 252 may be communicatively coupled to and configured to receive measurement signals from one or more sensor sets 236, 238, 240, 242, 244, 246, 248, 250, and other process control components (not shown) of contaminant removal system 200, such as: control valves for cabin air stream 208, clean air stream 210, sweep gas stream 214, contaminant stream 212, and inlets/outlets to heat exchanger 224, heater 228, liquid sorbent storage 230, and cooler 234; pumps 226 and 232; blower 220; and the like.

Sensor sets 236, 238, 240, 242, 244, 246, 248, 250 may include instrumentation configured to detect any of a pressure, temperature, flow rate, and/or contaminant concentration (e.g., carbon dioxide concentration or water concentration) of a liquid or gas stream of contaminant removal system 200. For a cabin air circuit, cabin air sensor set 236 may detect conditions of cabin air stream 208 and clean air sensor set 238 may detect conditions of clean air stream 210. For liquid sorbent circuit 216, scrubber-separator outlet sensor set 240 may detect conditions of used liquid sorbent at an outlet of scrubber-separator 204, stripper-separator inlet sensor set 242 may detect conditions of used liquid sorbent at an inlet of stripper-separator 206, stripper-separator outlet sensor set 244 may detect conditions of clean liquid sorbent at an outlet of stripper-separator 206, and scrubber-separator inlet sensor set 246 may detect conditions of clean liquid sorbent at an inlet of scrubber-separator 204.

In some examples, controller 252 is configured to control a contaminant concentration within the environment of cabin 202. For example, controller 252 may be configured to receive a contaminant concentration measurement for a contaminant, such as from clean air sensor set 238 or a concentration sensor in cabin 202. Controller 252 may be configured to determine whether the contaminant concentration measurement exceeds a contaminant concentration setpoint. For example, the contaminant concentration setpoint may be a target concentration of clean air stream 210 for maintaining cabin 202 below a threshold contaminant concentration. Controller 252 may be configured to send, in response to the contaminant concentration measurement exceeding the contaminant concentration setpoint, a control signal to decrease a concentration of the contaminant in clean air stream 210. For example, controller 252 may send a control signal to increase a flow rate of liquid sorbent, a flow rate, humidity, and/or temperature of sweep gas stream 214, or any other variable that may increase a rate of removal of contaminants from cabin air stream 208.

Figure 3:
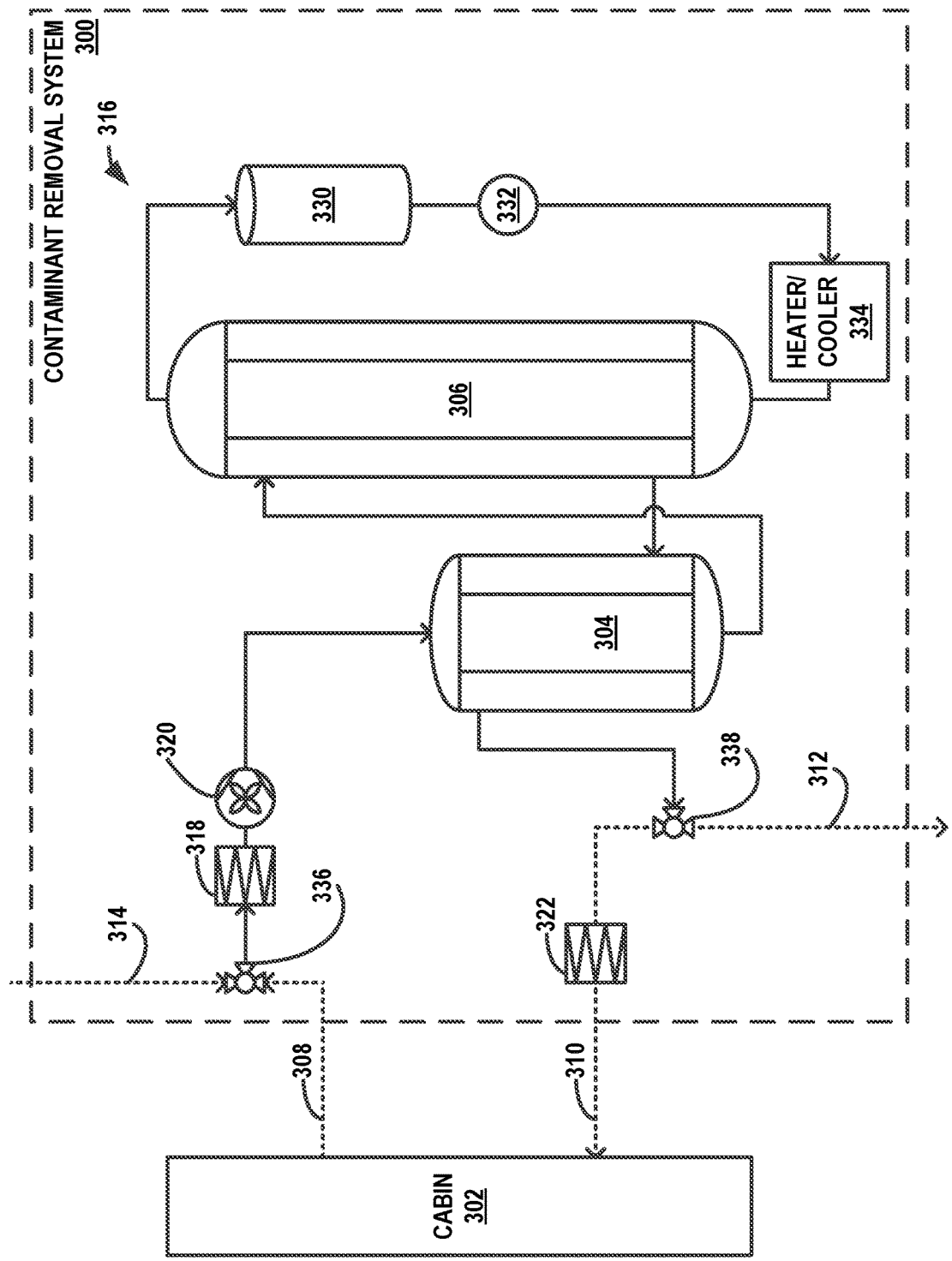
FIG. 3 is a diagram illustrating an example contaminant removal system for removing contaminants from an aircraft cabin using a single membrane separator operating in either a scrubbing mode or a stripping mode.

In some embodiments of contaminant removal systems discussed herein, contaminants may be removed from an aircraft cabin and discharged from the aircraft using a single membrane separator. For example, a membrane separator may form a liquid sorbent circuit that is capable of intermittent scrubbing of contaminants from the cabin air to produce clean air and intermittent stripping of contaminants from used liquid sorbent to discharge the contaminants. FIG. 3 is a diagram illustrating an example contaminant removal system 300 for removing contaminants from an aircraft cabin 302 using a single membrane separator 306 operating in either a scrubbing mode or a stripping mode. Unless otherwise indicated, components of contaminant removal system 300 may be operably similar to similarly named and/or numbered components of contaminant removal system 200 of FIG. 2. For example, a cabin 302, a cabin air stream 308, a clean air stream 310, a contaminant stream 312, a filter 318, a blower 320, a filter 322, a liquid sorbent storage 330, a pump 332, and a heat exchanger 334 may be functionally similar to cabin 202, cabin air stream 208, clean air stream 210, contaminant stream 212, filter 218, blower 220, filter 222, liquid sorbent storage 230, pump 232, and cooler 234, respectively.

Aircraft contaminant removal system 300 may include an inlet configured to receive cabin air stream 308 from cabin 302 and a cabin outlet configured to discharge clean air stream 310 to cabin 302. In some examples, contaminant removal system 300 includes an overboard inlet configured to receive external air stream 314 into the aircraft and an overboard outlet configured to discharge contaminant stream 312 from the aircraft.

Contaminant removal system 300 includes separator 306. Contaminant removal system 300 has a scrubbing mode and a stripping mode in which a gas phase side of separator 306 may be switched between a cabin circuit and an atmosphere supply and discharge, respectively.

In the scrubbing mode, separator 306 may absorb contaminants from cabin air to produce clean air. On a gas phase side, separator 306 is configured to receive a cabin air stream 308 from cabin 302 through a membrane dehumidifier 304. 3-way inlet valve 336 may be selected to receive cabin air from cabin air stream 308 and discharge cabin air to separator 306. Separator 306 may absorb a contaminant from cabin air stream 308 into a liquid sorbent. 3-way outlet valve 338 may be selected to receive clean air from separator 306 and discharge the clean air to a clean air stream 310 for return to cabin 302. On a liquid phase side, separator 306 is configured to receive clean liquid sorbent and discharge used liquid sorbent having a higher concentration of contaminants.

In the stripping mode, separator 306 may remove contaminants from liquid sorbent. On a gas phase side, separator 306 is configured to receive an external air stream 314. 3-way inlet valve 336 may be selected to receive sweep gas from an external air stream 314, such as from a ram air stream. Separator 306 may desorb the contaminant from the liquid sorbent using external air stream 314. Separator 306 may discharge the contaminant in a contaminant stream 312. 3-way outlet valve 338 may be selected to receive sweep gas containing contaminants from separator 306 and discharge the contaminated air to contaminant stream 312 for discharge from the aircraft. On a liquid phase side, separator 306 is configured to receive used liquid sorbent and discharge clean liquid sorbent having a lower concentration of contaminants.

In the example of FIG. 3, aircraft contaminant removal system 300 includes membrane dehumidifier 304 fluidically coupled to separator 306; however, other examples may not include dehumidifier 304. Dehumidifier 304 may be configured to transfer water from a gas stream having a higher humidity to a gas stream having a lower humidity.

In the scrubbing mode, dehumidifier 304 may be configured to recover humidity from cabin air stream 308 for use in clean air stream 310. On one side, dehumidifier 304 may be configured to receive cabin air from cabin air stream 308 as a feed gas and discharge cabin air having a lower humidity. On an opposite side, dehumidifier 304 may be configured to receive clean air from separator 306 as a sweep gas and discharge clean air to clean air stream 310 having a higher humidity. As a result, humidity from cabin 302 may be preserved.

In the stripping mode, dehumidifier 304 may be configured to recover humidity from contaminated air for use in external air stream 314. On one side, dehumidifier 304 may be configured to receive external air stream 314 as a sweep gas and discharge the sweep gas to separator 306 having a lower humidity. On an opposite side, dehumidifier 304 may be configured to receive contaminated air from separator 306 as a sweep gas and discharge the contaminated air to contaminant stream 312 having higher humidity. As a result, sweep gas used for stripping in separator 306 may have a lower humidity, increasing a rate of desorption of contaminants from the used liquid sorbent in separator 306 and avoiding accumulation of water in the liquid sorbent.

While FIG. 3 has been described with respect to a membrane separator configured for intermittent scrubbing and stripping operations on-board an aircraft, in some examples, a single membrane separator may be used for continuous scrubbing of contaminants from an air stream and subsequent storage of contaminants in a liquid sorbent circuit. For example, a membrane separator may form a liquid sorbent circuit that is capable of continuous scrubbing of contaminants from the cabin air in the on-board membrane separator to produce clean air and store used liquid sorbent on-board until the liquid sorbent may be discharged from the aircraft for subsequent stripping overboard. Once discharged, the liquid sorbent may either be stored and replaced with clean liquid sorbent or scrubbed and returned to the aircraft as recharged liquid sorbent.

In some examples, a controller (not shown in FIG. 3) may be configured to control a contaminant concentration within the environment of cabin 302. For example, the controller may be configured to control scrubbing and stripping operations to maintain a contaminant concentration below a threshold contaminant concentration, as explained with respect to controller 252 of FIG. 2. Further, the controller may be configured to coordinate the intermittent scrubbing and stripping operations. For example, during a scrubbing operation, the controller may receive one or more contaminant concentration measurements, such as from clean air stream 310 or liquid sorbent circuit 316, indicative of the liquid sorbent having absorbed a threshold amount of contaminants, such that further scrubbing may not be adequately effective. In response, the controller may switch operation of system 300 from a scrubbing operation to a stripping operation, such as by operating 3-way inlet valve 336 to switch an inlet from cabin air stream 308 to external air stream 314 and operating 3-way outlet valve 338 to switch an outlet from clean air stream 310 to contaminant stream 312. Conversely, during a stripping operation, the controller may receive one or more contaminant concentration measurements indicative of the liquid sorbent having desorbed a threshold amount of contaminants, such that further scrubbing may continue. In response, the controller may switch operation of system 300 from a stripping operation to a scrubbing operation, such as by operating 3-way inlet valve 336 to switch an inlet from external air stream 314 to cabin air stream 308 and operating 3-way outlet valve 338 to switch an outlet from contaminant stream 312 to clean air stream 310.

In some embodiments of contaminant removal systems discussed herein, a portion of contaminants may be removed at various points in the contaminant removal system and recycled back into the aircraft cabin or a component of the contaminant removal system. For example, a humidity management system may remove water from a contaminant stream and use the removed water in one or more components of the contaminant removal system. FIGS. 4-7 illustrate various configurations of contaminant removal systems that include humidity management systems for managing humidity and/or water concentration in the various contaminant removal systems. Humidity management systems may be configured to maintain a humidity of a clean air stream and/or a water concentration of the liquid sorbent using one or more water sources of the aircraft. For example, cabin air within an aircraft cabin may have a target humidity range for passenger comfort, such as between about 5% and about 35% relative humidity. To achieve this target humidity range, the flow rate of cabin air leaving the cabin and/or the flow rate and/or humidity of clean air entering the cabin may be selected to maintain the humidity of the cabin within the target humidity range. As such, humidity management systems discussed herein may add water to a recycled air stream from one or more water sources on the aircraft and/or remove water from the recycled air stream to one or more water sources on the aircraft to achieve a desired humidity of a clean air stream entering the cabin. Additionally or alternatively, humidity management systems discussed herein may add water to a liquid sorbent circuit from one or more water sources on the aircraft to achieve a desired water concentration of the liquid sorbent. In some examples, the water sources include at least one of a cabin air stream, a crown water collection system, a potable water storage system, or the liquid sorbent.

Figure 4:
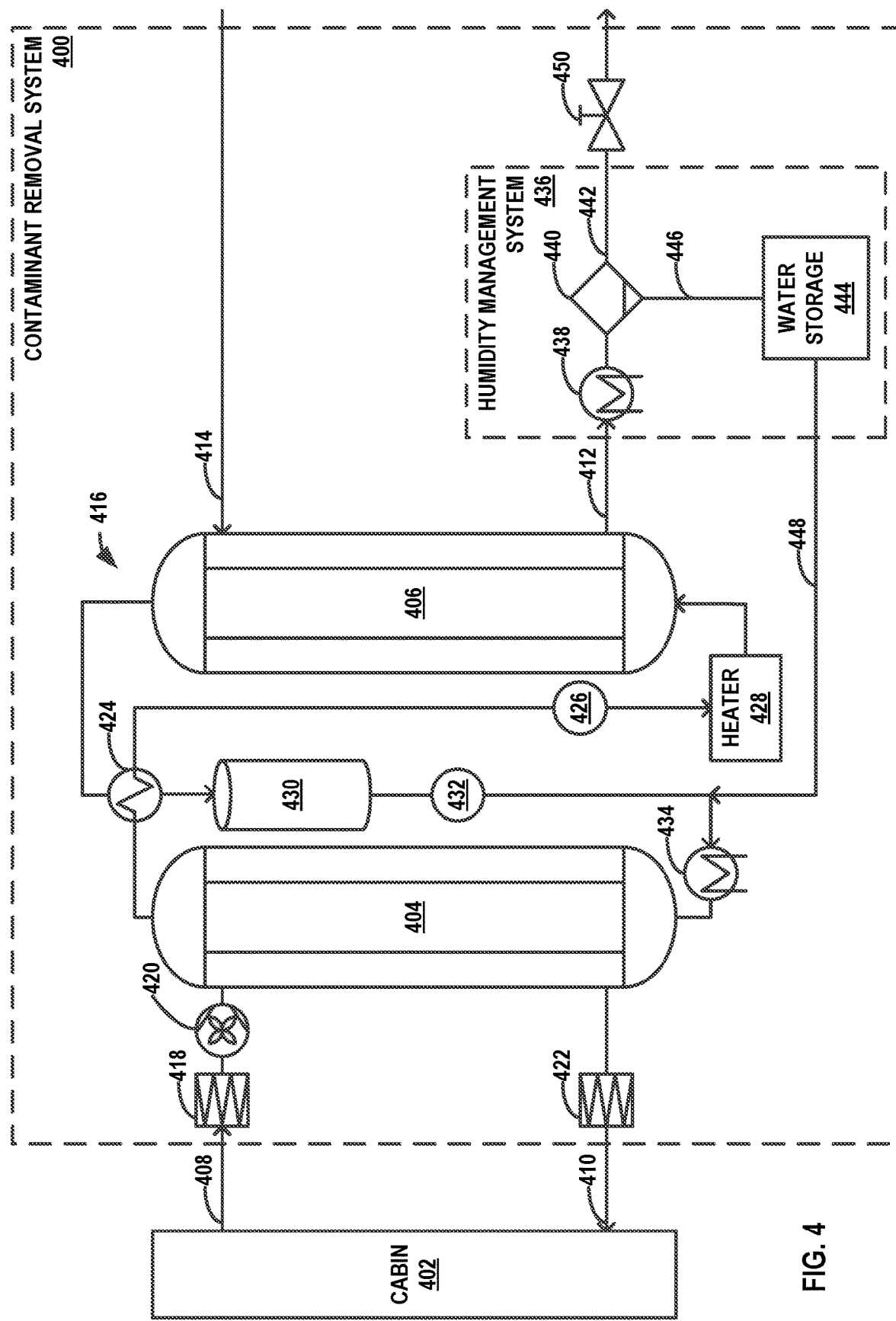
FIG. 4 is a diagram illustrating an example contaminant removal system for removing contaminants from an aircraft cabin using a liquid sorbent with a membrane scrubber-separator and a membrane stripper-separator and maintaining humidity in the aircraft cabin using a humidity management system.

In some examples, a humidity management system discussed herein may remove water from a contaminant stream of a contaminant removal system. FIG. 4 is a diagram illustrating an example system for removing contaminants from an aircraft cabin using a liquid sorbent with a membrane scrubber-separator and a membrane stripper-separator and maintaining humidity in the aircraft cabin using a humidity management system 436. Unless otherwise indicated, components of contaminant removal system 400 may be operably similar to similarly named and/or numbered components of contaminant removal system 200 of FIG. 2. For example, a cabin 402, a scrubber-separator 404, a stripper-separator 406, a cabin air stream 408, a clean air stream 410, a contaminant stream 412, a sweep gas stream 414, a liquid sorbent circuit 416, a filter 418, a blower 420, a filter 422, a heat exchanger 424, a pump 426, a heater 428, a liquid sorbent storage 430, a pump 432, and a cooler 434 may be functionally similar to cabin 202, scrubber-separator 204, stripper-separator 206, cabin air stream 208, clean air stream 210, contaminant stream 212, sweep gas stream 214, liquid sorbent circuit 216, filter 218, blower 220, filter 222, heat exchanger 224, pump 226, heater 228, liquid sorbent storage 230, pump 232, and cooler 234, respectively.

Contaminant removal system 400 includes a humidity management system 436. Humidity management system 436 is configured to remove water from a contaminant stream 412. In the example of FIG. 4, humidity management system 436 includes a condenser 438 and a water separator 440. Condenser 438 is configured to cool contaminant stream 412 and condense water from contaminant stream 412. For example, condenser 438 may be fluidically coupled to a refrigerant stream or other cooling fluid stream that circulates a cooling medium to cool contaminant stream 412. A variety of condensers may be used for condenser 438 including, but not limited to, shell and tube heat exchangers, plate-fin, surface coolers, heat pipes, thermoelectric devices, cooling jackets, and the like. Water separator 440 is configured to separate the condensed water from condenser 438 and discharge the separated water in a water discharge stream 446 and the remaining gas in a dried contaminant stream 442. A variety of water separators may be used for water separator 440 including, but not limited to, membrane separators, centrifugal/rotary separators, and the like. Humidity management system 436 includes water storage 444. Water storage 444 is configured to receive water from water discharge stream 446.

In some examples, at least a portion of water from the one or more water sources is recycled to the liquid sorbent to maintain a water concentration of the liquid sorbent. Scrubber-separator 404 and/or stripper-separator 406 may lose water over time. To restore a desired water concentration of the liquid sorbent, humidity management system 436 may add water to liquid sorbent circuit 416. For example, contaminant removal system 400 includes a water sorbent recycle stream 448 configured to discharge water from water storage 444 into liquid sorbent circuit 416. While not shown, water sorbent recycle stream 448 may include a pump and control valves to discharge the water into liquid sorbent circuit 416.

In the example of FIG. 4, contaminant stream 412 includes a pressure control valve 450. Pressure control valve 450 may be configured to control a vacuum for a gas phase side of stripper-separator 406. For example, a vacuum may increase a rate of desorption of the contaminants from the used liquid sorbent without a sweep gas stream or with a smaller sweep gas stream.

In some examples, a controller (not shown in FIG. 4) may be configured to control a humidity within the environment of cabin 402. For example, the controller may be configured to control scrubbing and stripping operations to maintain a contaminant concentration below a threshold contaminant concentration, as explained with respect to controller 252 of FIG. 2. Further, the controller may be configured to recover water removed from cabin air stream 408 and use the recovered water in one or more systems of system 400. For example, to recover water from contaminant stream 412, the controller may receive a humidity concentration of clean air stream 410 and, in response to determining that the water concentration is below a threshold, increase condensation and/or separation of water from contaminant stream 412, such as by increasing a flow rate of cooling fluid to condenser 438 and/or increasing a speed of a mechanical separation device (centrifugal) of water separator 440. As another example, to recycle the recovered water from contaminant stream 412, the controller may receive a water concentration of liquid sorbent circuit 416 and, in response to the water concentration measuring below a threshold water concentration, control a flow control valve to discharge removed water from water storage 444 through water sorbent recycle stream 448 into liquid sorbent circuit 416. As another example, to control a vacuum of stripper-separator 406, the controller may receive a pressure measurement from stripper-separator 406 and, in response to the pressure measurement measuring outside a target pressure range, control pressure control valve 450 to increase or decrease a pressure of stripper-separator 406.

Figure 5A:
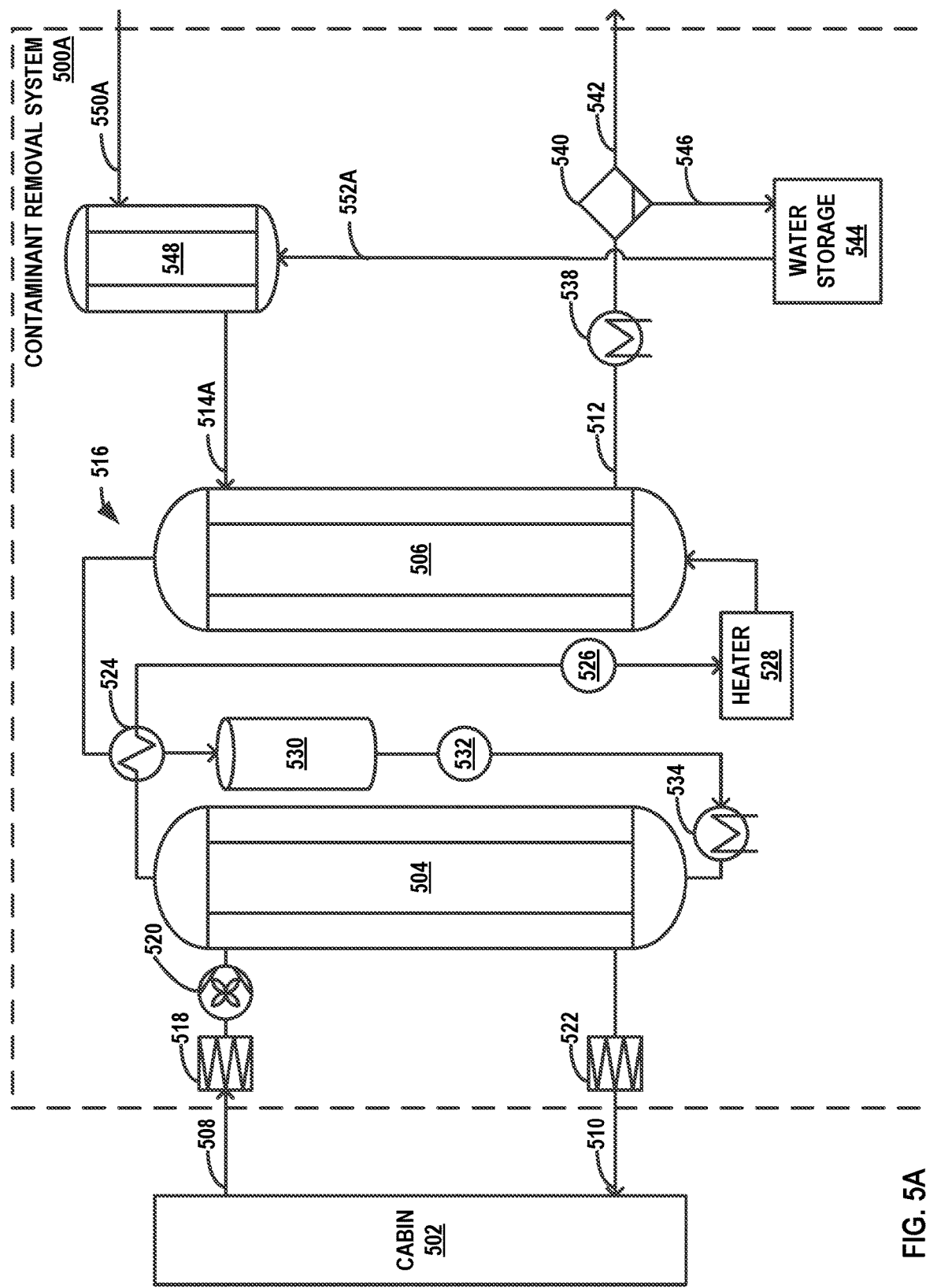
FIG. 5A is a diagram illustrating an example contaminant removal system for removing contaminants from an aircraft cabin using a liquid sorbent with a membrane scrubber-separator and a membrane stripper-separator and maintaining humidity in the aircraft cabin using a water vaporizer to humidify sweep gas.
Figure 5B:
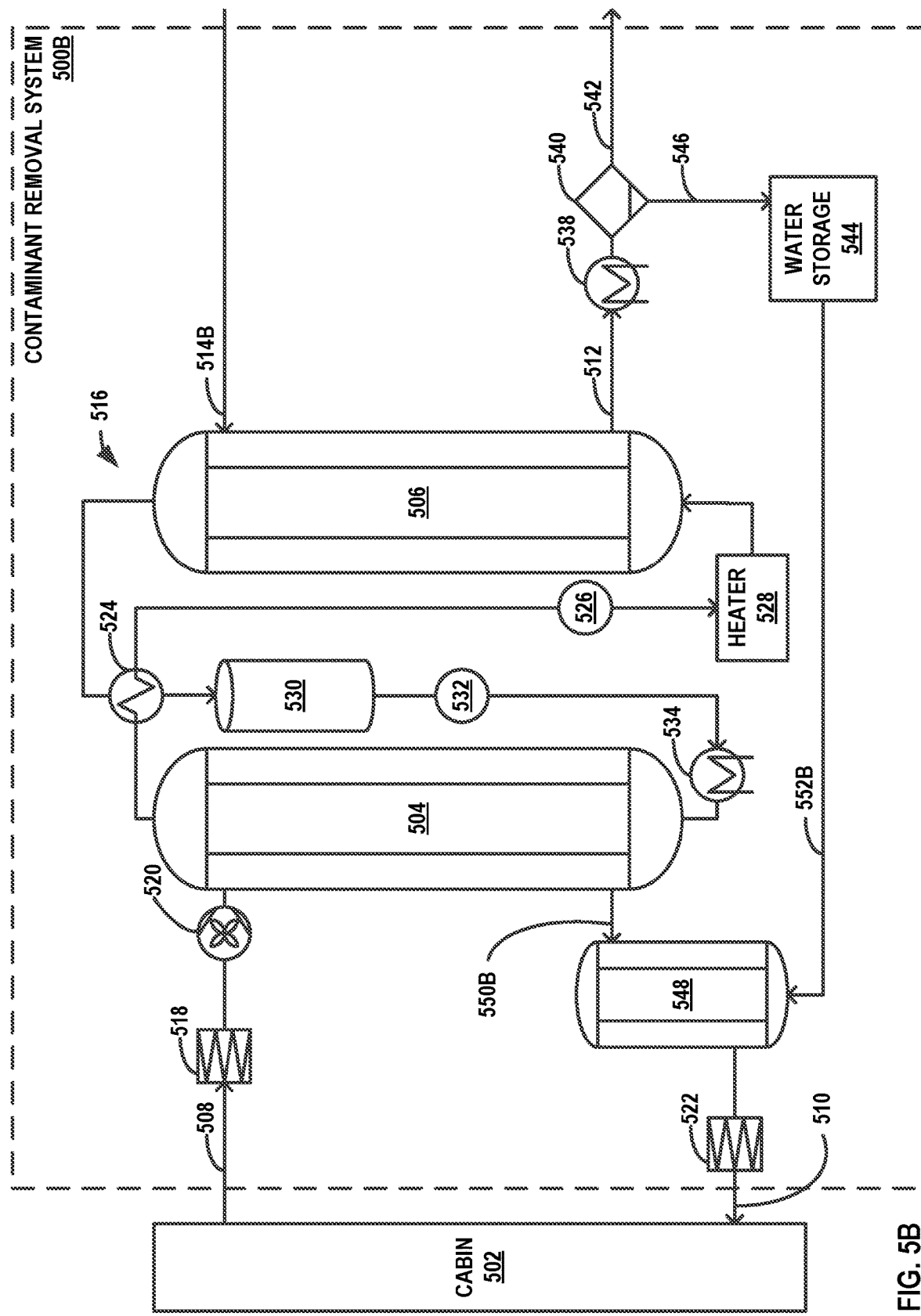
FIG. 5B is a diagram illustrating an example contaminant removal system for removing contaminants from an aircraft cabin using a liquid sorbent with a membrane scrubber-separator and a membrane stripper-separator and maintaining humidity in the aircraft cabin using a water vaporizer to conserve humidity from cabin air.

In some examples, humidity management systems discussed herein may vaporize water removed from a contaminant stream or other water source of an aircraft. FIGS. 5A and 5B illustrate various configurations of a water vaporizer 548 as part of a humidity management system in contaminant removal systems 500A and 500B, respectively. Unless otherwise indicated, components of contaminant removal systems 500A and 500B may be operably similar to similarly named and/or numbered components of contaminant removal system 400 of FIG. 4. For example, a cabin 502, a scrubber-separator 504, a stripper-separator 506, a cabin air stream 508, a clean air stream 510, a contaminant stream 512, a sweep gas stream 514A, a sweep gas stream 514B, a liquid sorbent circuit 516, a filter 518, a blower 520, a filter 522, a heat exchanger 524, a pump 526, a heater 528, a liquid sorbent storage 530, a pump 532, a cooler 534, a condenser 538, a water separator 540, a dried contaminant stream 542, a water storage 544, and a water discharge stream 546 may be functionally similar to cabin 402, scrubber-separator 404, stripper-separator 406, cabin air stream 408, clean air stream 410, contaminant stream 412, sweep gas stream 414, liquid sorbent circuit 416, filter 418, blower 420, filter 422, heat exchanger 424, pump 426, heater 428, liquid sorbent storage 430, pump 432, cooler 434, condenser 438, water separator 440, dried contaminant stream 442, water storage 444, and water discharge stream 446, respectively.

In some examples, water vaporizer 548 may vaporize water for use in a sweep gas to increase a humidity of the sweep gas and maintain a water concentration of the liquid sorbent. FIG. 5A is a diagram illustrating an example system 500A for removing contaminants from an aircraft cabin using a liquid sorbent with a membrane scrubber-separator and a membrane stripper-separator and maintaining humidity in the aircraft cabin using a water vaporizer to humidify sweep gas. Stripper-separator 506 may lose water from the liquid sorbent due to a low concentration of water in sweep gas stream 514. In the example of FIG. 5A, water vaporizer 548 is configured to add water from water storage 544 to a sweep gas stream 514A of stripper-separator 506. Water storage 544 may pump water through a water vaporizer inlet stream 552A to water vaporizer 548. Water vaporizer 548 may receive dry sweep gas stream 550A, add humidity to dry sweep gas stream 550A using water from water storage 544, and discharge sweep gas stream 514A into stripper-separator 506 having a higher humidity than dry sweep gas stream 550A. In other examples, water vaporizer 548 may be configured to add water from one or more water sources, such as potable water. By increasing a humidity of sweep gas stream 514A, stripper-separator 506 may operate at a higher efficiency for desorbing contaminants.

In some examples, water vaporizer 548 may vaporize water to increase a humidity of clean air returned to an aircraft cabin. FIG. 5B is a diagram illustrating an example system 500B for removing contaminants from an aircraft cabin 502 using a liquid sorbent with a membrane scrubber-separator 504 and a membrane stripper-separator 506 and maintaining humidity in the aircraft cabin using a water vaporizer 548 to conserve humidity in cabin air. Cabin air from cabin air stream 508 may lose humidity, such as to liquid sorbent, cabin discharge, or another mechanism. In the example of FIG. 5B, water vaporizer 548 is configured to add water from water storage 544 to clean air stream 510. Water storage 544 may pump water through a water vaporizer inlet stream 552B to water vaporizer 548. Water vaporizer 548 may receive dry clean air stream 550B, add humidity to dry clean air stream 550B using water from water storage 544, and discharge clean air to clean air stream 510 having a higher humidity. In other examples, water vaporizer 548 may be configured to add water from one or more water sources, such as potable water. By increasing a humidity of clean air stream 510 to aircraft cabin 502, less water may be added by an air conditioning system.

In some examples, a controller (not shown in FIGS. 5A and 5B) may be configured to control a humidity within the environment of cabin 502. For example, the controller may be configured to control scrubbing and stripping operations to maintain a contaminant concentration below a threshold contaminant concentration, as explained with respect to controller 252 of FIG. 2. Further, the controller may be configured to increase a humidity of sweep gas stream 514A of FIG. 5A and/or clean air stream 510 of FIG. 5B by controlling water vaporizer 548. For example, the controller may receive a humidity measurement of stripper-separator 506 and/or dry sweep gas stream 550A (for FIG. 5A) or a humidity measurement of clean air stream 510 and/or dry sweep gas stream 550B (for FIG. 5B) and, in response to determining that the humidity measurement is outside a target humidity range, control an amount of water added to dry sweep gas streams 550A and 550B, respectively, to increase a humidity of sweep gas stream 514A or clean air stream 510.

Figure 6A:
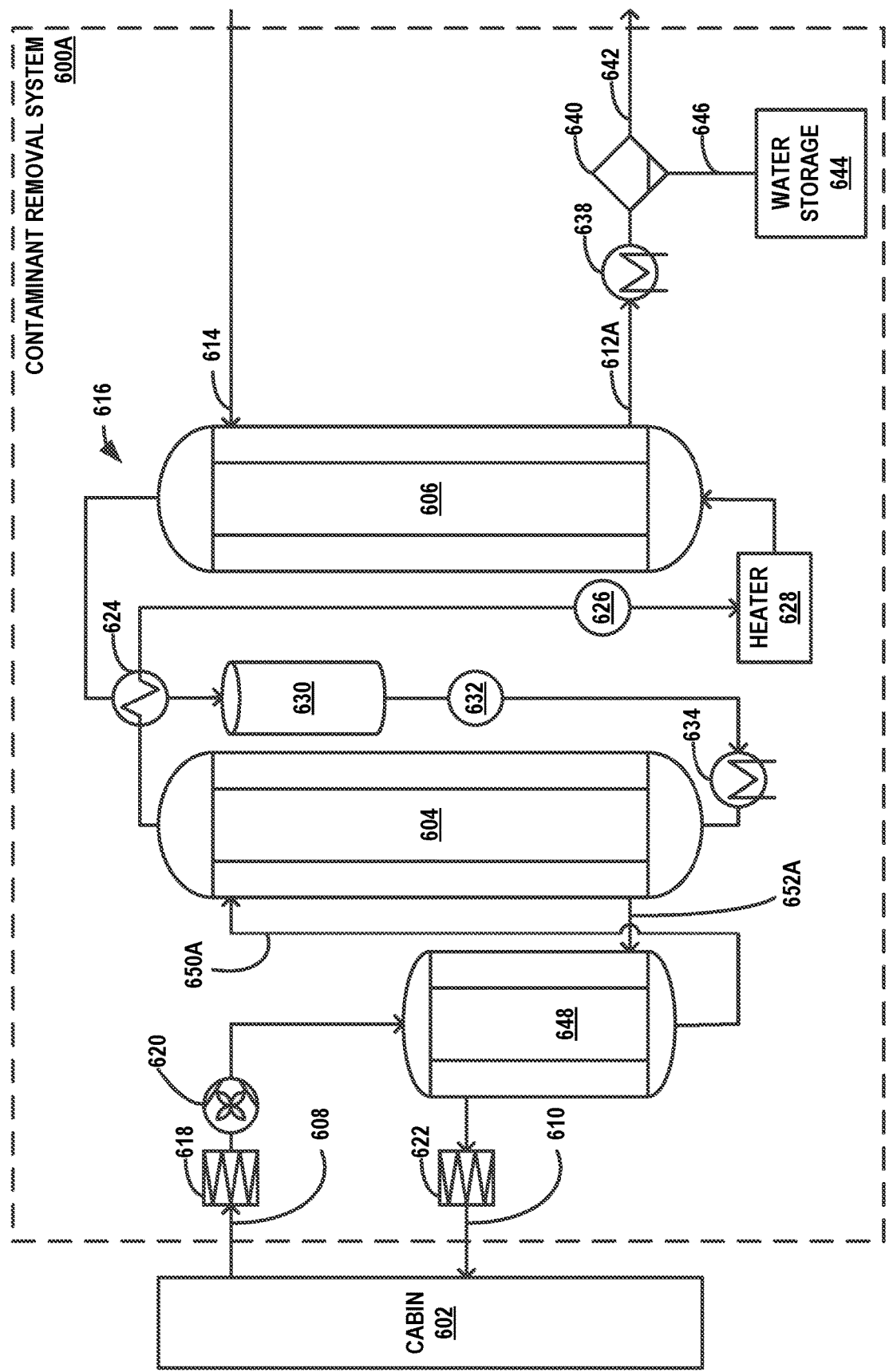
FIG. 6A is a diagram illustrating an example contaminant removal system for removing contaminants from an aircraft cabin using a liquid sorbent with a membrane scrubber-separator and a membrane stripper-separator and maintaining humidity in the aircraft cabin using a dehumidifier to capture humidity from cabin air.
Figure 6B:
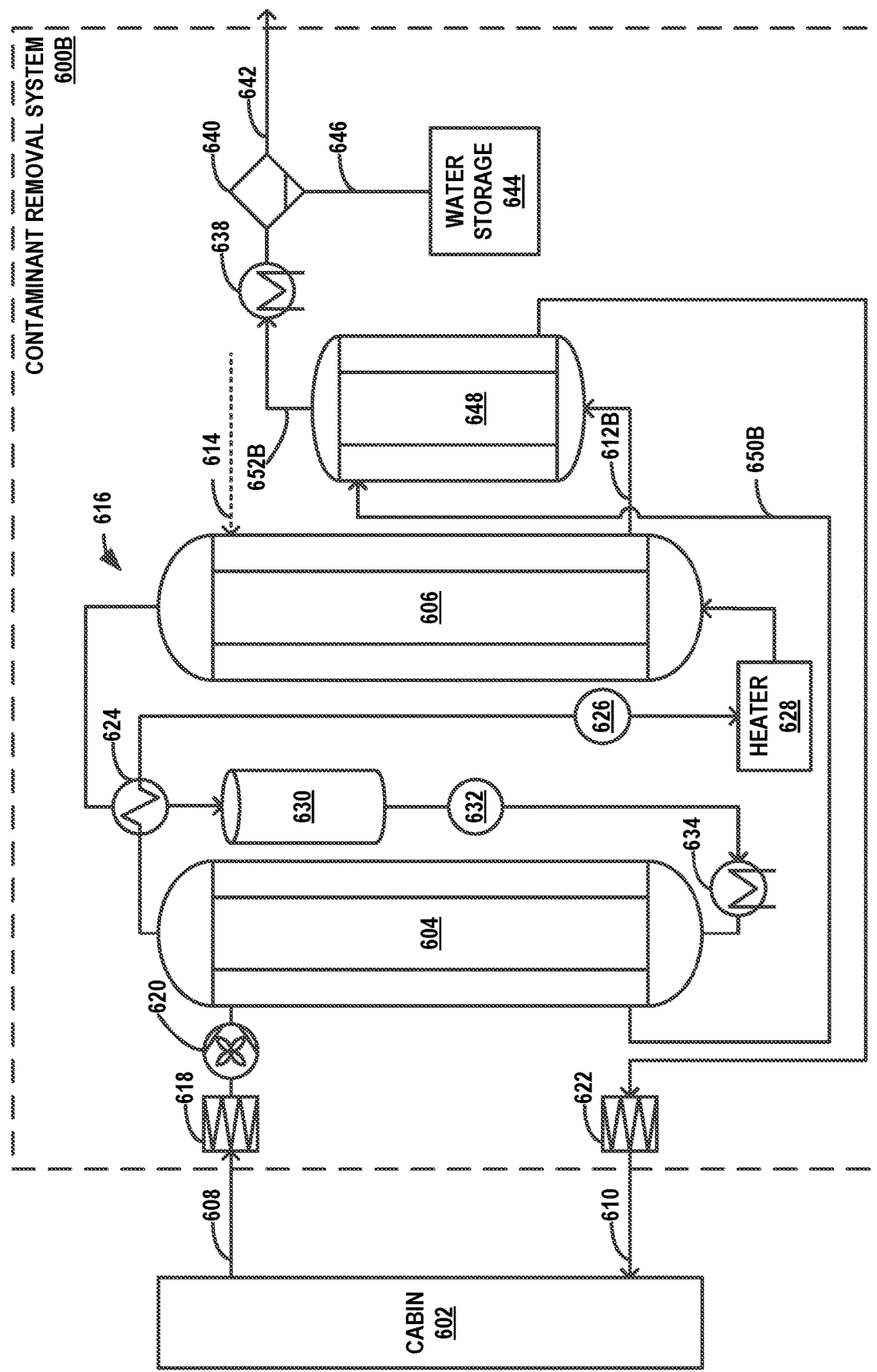
FIG. 6B is a diagram illustrating an example contaminant removal system for removing contaminants from an aircraft cabin using a liquid sorbent with a membrane scrubber-separator and a membrane stripper-separator and maintaining humidity in the aircraft cabin using a dehumidifier to capture humidity from sweep gas.

In some examples, humidity management systems discussed herein may remove humidity from a cabin air stream, contaminant stream, or other stream of an aircraft using a membrane dehumidifier. FIGS. 6A and 6B illustrate various configurations of a membrane dehumidifier 648 as part of a humidity management system in contaminant removal systems 600A and 600B, respectively. Unless otherwise indicated, components of contaminant removal systems 600A and 600B may be operably similar to similarly named and/or numbered components of contaminant removal system 400 of FIG. 4. For example, a cabin 602, a scrubber-separator 604, a stripper-separator 606, a cabin air stream 608, a clean air stream 610, a contaminant stream 612A, a contaminant stream 612B, a sweep gas stream 614, a liquid sorbent circuit 616, a filter 618, a blower 620, a filter 622, a heat exchanger 624, a pump 626, a heater 628, a liquid sorbent storage 630, a pump 632, a cooler 634, a condenser 638, a water separator 640, a dried contaminant stream 642, a water storage 644, and a water discharge stream 646 may be functionally similar to cabin 402, scrubber-separator 404, stripper-separator 406, cabin air stream 408, clean air stream 410, contaminant stream 412, sweep gas stream 414, liquid sorbent circuit 416, filter 418, blower 420, filter 422, heat exchanger 424, pump 426, heater 428, liquid sorbent storage 430, pump 432, cooler 434, condenser 438, water separator 440, dried contaminant stream 442, water storage 444, and water discharge stream 446, respectively.

In some examples, dehumidifier 648 may capture humidity from cabin air to increase humidity of clean air. FIG. 6A is a diagram illustrating an example system for removing contaminants from an aircraft cabin using a liquid sorbent with a membrane scrubber-separator and a membrane stripper-separator and maintaining humidity in the aircraft cabin using a dehumidifier to capture humidity from cabin air. During contaminant removal, water may be removed as a contaminant from cabin air stream 608 by scrubber-separator 604, such that clean air discharged to clean air stream 610 from scrubber-separator 604 may have a lower humidity than desired. In the example of FIG. 6A, dehumidifier 648 is configured to return humidity from cabin air stream 608 to clean air stream 610. On one side, dehumidifier 648 is configured to receive cabin air stream 608 as a feed gas stream and discharge cabin air in a dried cabin air stream 650A to scrubber-separator 604 having a lower humidity. On an opposite side, dehumidifier 648 is configured to receive a dry clean air stream 652A from scrubber-separator 604 and discharge clean air to clean air stream 610 having a higher humidity. By capturing humidity from cabin air prior to entry of cabin air from cabin air stream 608 into scrubber-separator 604, a greater amount of humidity may be preserved. For example, removing water prior to going through scrubber-separator 604 may result in less excess water that is absorbed into the liquid sorbent. This water removal may allow for smaller sizing of scrubber-separator 604 and/or stripper-separator 606, and/or a smaller load on heater 628 and pumps 426 and 432. This water removal may also result in less water becoming absorbed into the liquid and, corresponding, less water to be removed, such that cooling requirements of sweep gas stream 614, chiller 638, and separator 640 may be decreased, with a correspondingly decreased size and weight.

In some examples, dehumidifier 648 may capture humidity from contaminated air to increase humidity of the clean air. FIG. 6B is a diagram illustrating an example system for removing contaminants from an aircraft cabin using a liquid sorbent with a membrane scrubber-separator and a membrane stripper-separator and maintaining humidity in the aircraft cabin using a dehumidifier to capture humidity from sweep gas. Contaminant stream 612B may include a relatively high amount of water. In the example of FIG. 6B, dehumidifier 648 is configured to return humidity from contaminant stream 612B to clean air stream 610. On one side, dehumidifier 648 is configured to receive contaminant stream 612B as a feed gas stream and discharge dried contaminant stream 652B to condenser 638 for further water removal. On an opposite side, dehumidifier 648 is configured to receive dry clean air stream 650B from scrubber-separator 604 and discharge clean air to clean air stream 610 having a higher humidity. By capturing humidity from contaminant stream 612B, a greater amount of water may be preserved. For example, absorbing humidity into the liquid sorbent may result in the humidity becoming desorbed in stripper-separator 606. This desorption of humidity in 606 may increase a volume of sweep gas stream 614, such that the volume of sweep gas stream 614, size of stripper-separator 606, and/or load of chiller 638 and/or separator 640 may be decreased.

In some examples, a controller (not shown in FIGS. 6A and 6B) may be configured to control a humidity within the environment of cabin 602. For example, the controller may be configured to control scrubbing and stripping operations to maintain a contaminant concentration below a threshold contaminant concentration, as explained with respect to controller 252 of FIG. 2. Further, the controller may be configured to control systems 600A and 600B to increase a humidity of clean air stream 610 using dehumidifier 648.

Figure 7:
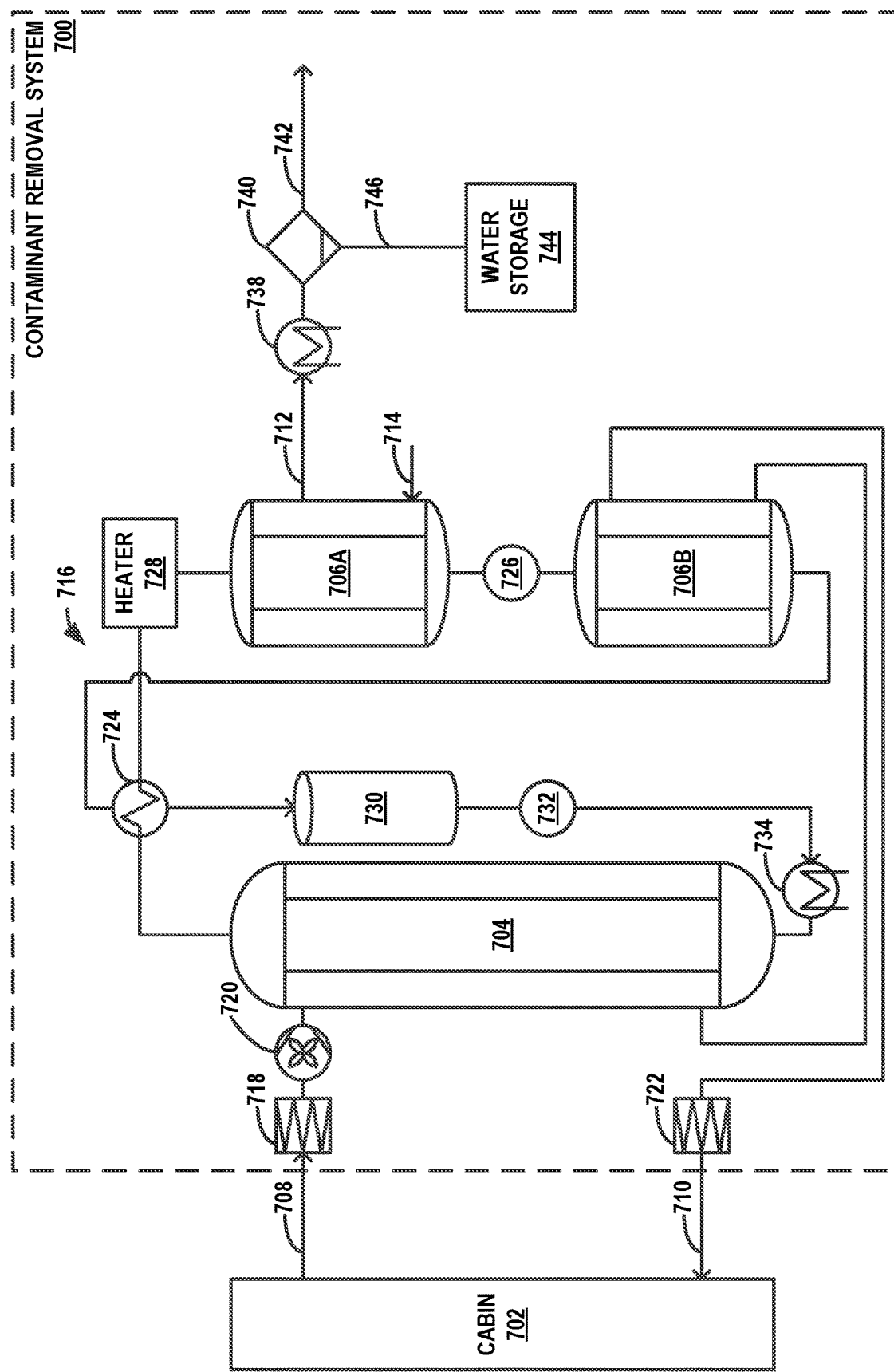
FIG. 7 is a diagram illustrating an example contaminant removal system for removing contaminants from an aircraft cabin using a liquid sorbent with a membrane scrubber-separator and a contaminant membrane stripper-separator and maintaining humidity in the aircraft cabin using a water membrane stripper-separator.

In some examples, humidity management systems discussed herein may remove contaminants from the liquid sorbent using a first stripper-separator and humidity using a second stripper-separator. FIG. 7 is a diagram illustrating an example system for removing contaminants from an aircraft cabin using a liquid sorbent with a membrane scrubber-separator 704 and a contaminant membrane stripper-separator 706A and maintaining humidity in the aircraft cabin using a water membrane stripper-separator 706B. Unless otherwise indicated, components of contaminant removal system 700 may be operably similar to similarly named and/or numbered components of contaminant removal system 400 of FIG. 4. For example, a cabin 702, a scrubber-separator 704, a cabin air stream 708, a clean air stream 710, a contaminant stream 712, a sweep gas stream 714, a liquid sorbent circuit 716, a filter 718, a blower 720, a filter 722, a heat exchanger 724, a pump 726, a heater 728, a liquid sorbent storage 730, a pump 732, a cooler 734, a condenser 738, a water separator 740, a dried contaminant stream 742, a water storage 744, and a water discharge stream 746 may be functionally similar to cabin 402, scrubber-separator 404, cabin air stream 408, clean air stream 410, contaminant stream 412, sweep gas stream 414, liquid sorbent circuit 416, filter 418, blower 420, filter 422, heat exchanger 424, pump 426, heater 428, liquid sorbent storage 430, pump 432, cooler 434, condenser 438, water separator 440, dried contaminant stream 442, water storage 444, and water discharge stream 446, respectively.

Contaminant stripper-separator 706A is configured to remove contaminants from the liquid sorbent and discharge the contaminants to a contaminant stream 712 for further water removal. On a liquid phase side, contaminant stripper-separator 706A may be configured to receive used liquid sorbent from scrubber-separator 704 and discharge clean liquid sorbent to water stripper-separator 706B. On a gas phase side, contaminant stripper-separator 706A is configured to receive a sweep gas stream 714 and discharge a contaminant stream 712.

Water stripper-separator 706B is configured to remove water from the liquid sorbent and use the removed water to increase humidity of a clean air stream 710. On a liquid phase side, water stripper-separator 706B is configured to receive clean liquid sorbent from contaminant stripper-separator 706A and discharge clean liquid sorbent to scrubber-separator 704 having a lower concentration of water. On a gas phase side, water stripper-separator 706B is configured to receive clean air from scrubber-separator 704 as a sweep gas stream and discharge clean air to clean air stream 710 having a higher humidity.

In some examples, a controller (not shown in FIG. 7) may be configured to control a humidity within the environment of cabin 702. For example, the controller may be configured to control scrubbing and stripping operations to maintain a contaminant concentration below a threshold contaminant concentration, as explained with respect to controller 252 of FIG. 2. Further, the controller may be configured to control conditions of contaminant stripper-separator 706A and water stripper-separator 706B to improve recovery of water from water stripper-separator 706B. For example, the controller may control any of a temperature of contaminant stripper-separator 706A and/or water stripper-separator 706B, a flow rate of sweep gas stream 714, and/or a flow rate of liquid sorbent through liquid sorbent circuit 716.

Figure 8A:
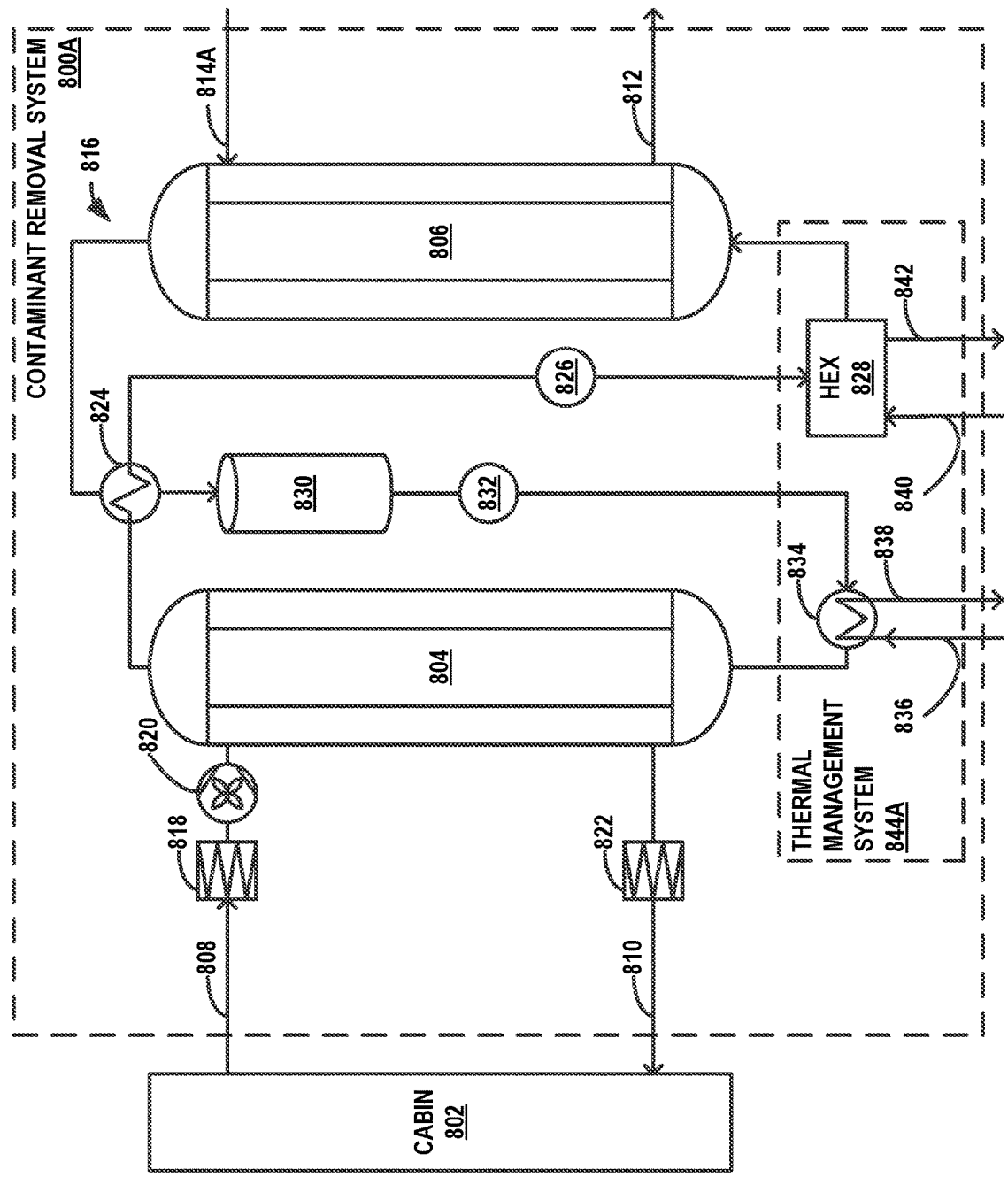
FIG. 8A is a diagram illustrating an example contaminant removal system for removing contaminants from an aircraft cabin using a liquid sorbent with a membrane scrubber-separator and a membrane stripper-separator and maintaining a temperature of the liquid sorbent using an aircraft fluid stream.
Figure 8B:
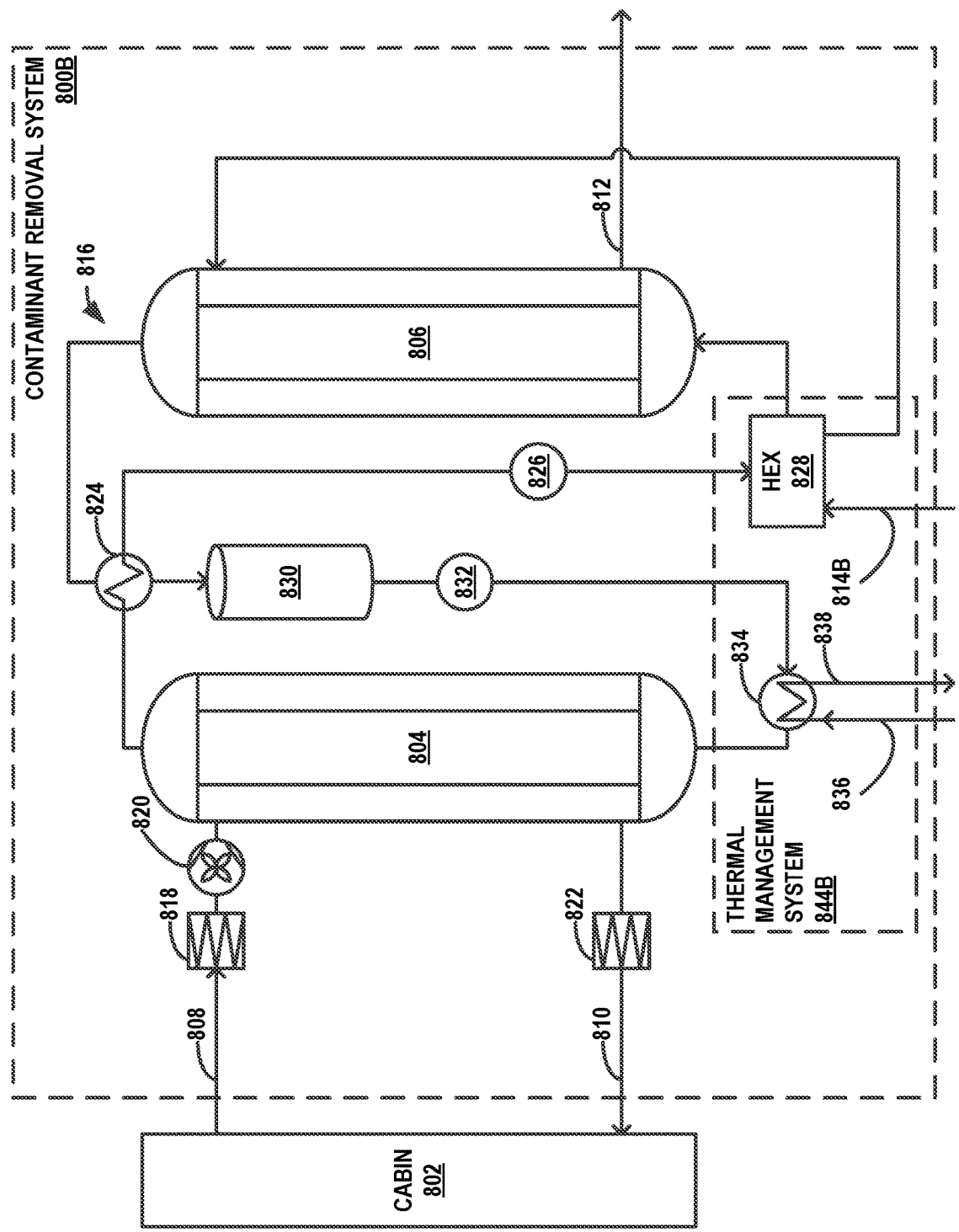
FIG. 8B is a diagram illustrating an example contaminant removal system for removing contaminants from an aircraft cabin using a liquid sorbent with a membrane scrubber-separator and a membrane stripper-separator and maintaining a temperature of the liquid sorbent using a sweep gas as a cooling fluid.
Figure 8C:
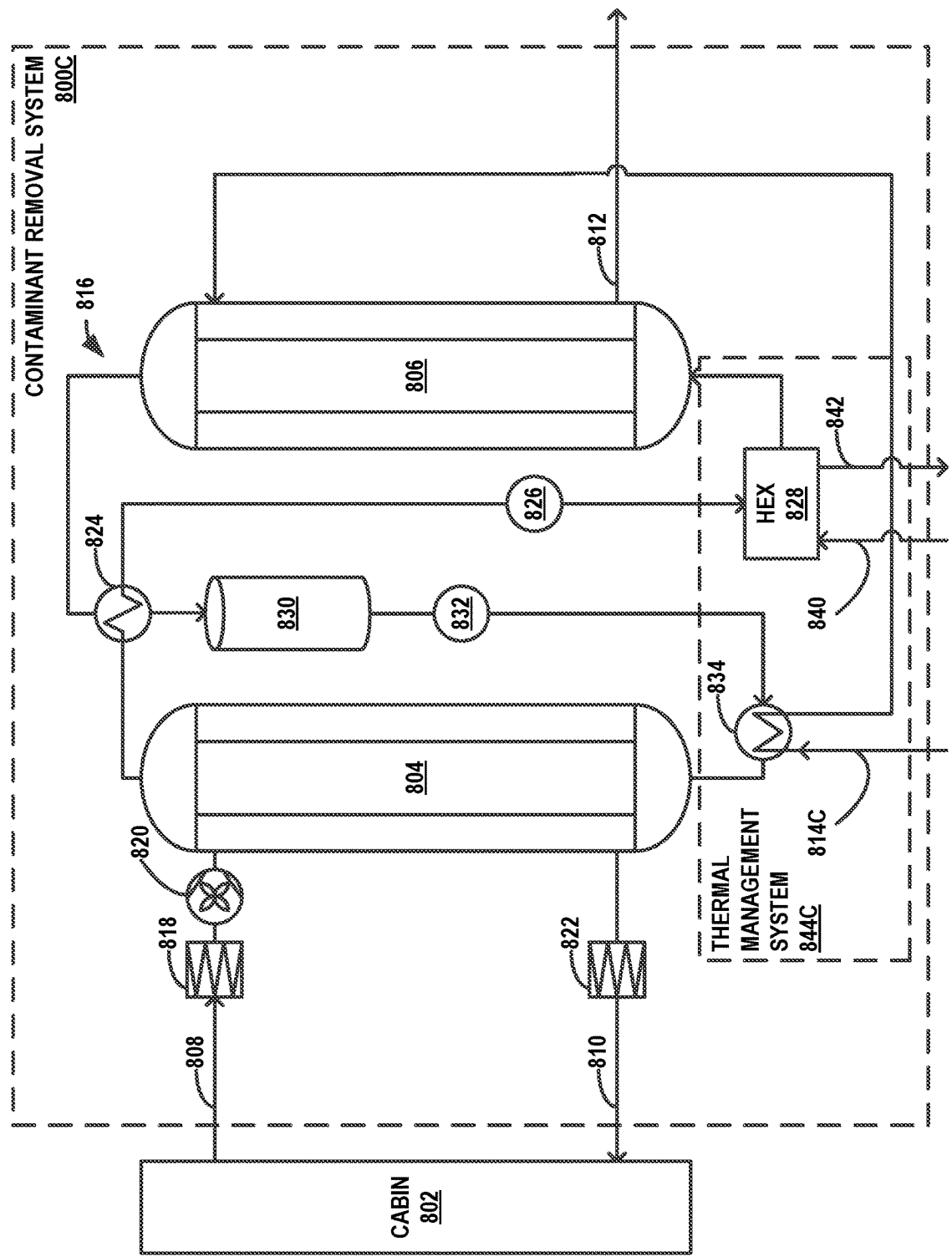
FIG. 8C is a diagram illustrating an example contaminant removal system for removing contaminants from an aircraft cabin using a liquid sorbent with a membrane scrubber-separator and a membrane stripper-separator and maintaining a temperature of the liquid sorbent using a sweep gas as a heating fluid.

In some embodiments of contaminant removal systems discussed herein, air streams associated with aircraft systems may be used to manage a temperature of various fluid streams, such as a liquid sorbent circuit and/or cabin air circuit, of a contaminant removal system. FIGS. 8A-8C illustrate various configurations of contaminant removal systems that include thermal management systems for managing temperature in the various contaminant removal systems. Unless otherwise indicated, components of contaminant removal systems 800A, 800B, and 800C may be operably similar to similarly named and/or numbered components of contaminant removal system 200 of FIG. 2. For example, a cabin 802, a scrubber-separator 804, a stripper-separator 806, a cabin air stream 808, a clean air stream 810, a contaminant stream 812, a sweep gas stream 814A, a sweep gas stream 814B, a sweep gas stream 814C, a liquid sorbent circuit 816, a filter 818, a blower 820, a filter 822, a heat exchanger 824, a pump 826, a liquid sorbent storage 830, and a pump 832 may be functionally similar to cabin 202, scrubber-separator 204, stripper-separator 206, cabin air stream 208, clean air stream 210, contaminant stream 212, sweep gas stream 214, liquid sorbent circuit 216, filter 218, blower 220, filter 222, heat exchanger 224, pump 226, liquid sorbent storage 230, and pump 232, respectively.

Thermal management systems 844A, 844B, 844C of FIGS. 8A-8C may be configured to maintain a temperature of the liquid sorbent using one or more heat exchangers fluidically coupled to an aircraft air stream. In some examples, the aircraft air stream includes at least one of: a cabin discharge stream, such as cabin air stream 808; a ram air stream, such as sweep gas stream 814A; an exhaust air stream; or a bleed air stream.

In some examples, a stripper-separator heater and/or a scrubber-separator cooler may be configured to receive a respective hot or cold air stream from the aircraft. FIG. 8A is a diagram illustrating an example system for removing contaminants from an aircraft cabin using a liquid sorbent with a membrane scrubber-separator and a membrane stripper-separator and maintaining a temperature of the liquid sorbent using an aircraft air stream. Thermal management system 844A includes a scrubber-separator pre-cooler 834 configured to receive an inlet cooling stream 836, cool the liquid sorbent using an aircraft air stream from inlet cooling stream 836, and discharge an outlet cooling stream 838. Thermal management system 844A includes a heat exchanger 828 configured to receive an inlet heating stream 840, heat the liquid sorbent using an aircraft air stream from inlet heating stream 840, and discharge an outlet heating stream 842.

In some examples, heat exchanger 828 may be configured to heat the liquid sorbent prior to entry into stripper-separator 806 using a bleed air stream from an aircraft propulsion system. For example, bleed air from one or more engines or auxiliary power units may be rerouted through heat exchanger 828 to heat liquid sorbent entering stripper-separator 806. As a result, an amount or rate of desorption of contaminants from the liquid sorbent may be increased. In some examples, a cooler 834 may be configured to cool the liquid sorbent prior to entry into scrubber-separator 804 using a ram air stream. For example, ram air may be rerouted through cooler 834 to cool liquid sorbent entering scrubber-separator 804. As a result, an amount or rate of absorption of contaminants by the liquid sorbent may be increased.

In some examples, a stripper-separator heater and/or a scrubber-separator cooler may be configured to receive a respective hot or cold air stream from the aircraft. FIG. 8B is a diagram illustrating an example contaminant removal system 800B that includes a thermal management system 844A for maintaining a temperature of the liquid sorbent using a sweep gas as a heating fluid. Thermal management system 844B includes heat exchanger 828 configured to receive a sweep gas stream 814B, heat the liquid sorbent using the sweep gas stream, and discharge the sweep gas stream into stripper-separator 806. FIG. 8C is a diagram illustrating an example contaminant removal system 800C that includes a thermal management system 844C for maintaining a temperature of the liquid sorbent using a sweep gas as a cooling fluid. Thermal management system 844C includes heat exchanger 828 configured to receive a sweep gas stream 814C, cool the liquid sorbent using the sweep gas stream, and discharge the sweep gas stream into stripper-separator 806.

In some examples, a controller (not shown in FIGS. 8A-8C) may be configured to control a humidity within the environment of cabin 802. For example, the controller may be configured to control scrubbing and stripping operations to maintain a contaminant concentration below a threshold contaminant concentration, as explained with respect to controller 252 of FIG. 2. Further, the controller may be configured to control air streams into heat exchanger 828 and/or cooler 834 to control a temperature of liquid sorbent entering stripper-separator 806, liquid sorbent entering scrubber-separator 804, and/or sweep gas stream 814B or 814C entering stripper-separator 806. For example, the controller may receive a temperature measurement of liquid sorbent prior to entering stripper-separator 806 or prior to entering scrubber-separator 804 and, in response to the temperature measurement being outside a target range, control a flow rate of an air stream entering heat exchanger 828 and/or cooler 834 to increase or decrease the temperature measurement to within the target range.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture, including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. An aircraft contaminant removal system comprising:
a membrane scrubber-separator configured to:
receive a cabin air stream from a cabin of an aircraft;
absorb a contaminant from the cabin air stream into a liquid sorbent; and
discharge a clean air stream;
a membrane stripper-separator configured to:
desorb the contaminant from the liquid sorbent; and
discharge the contaminant in a contaminant stream; and a humidity management system configured to:
  maintain a humidity of the clean air stream or a water concentration of the liquid sorbent using one or more water sources of the aircraft; and
  remove water from the contaminant stream,
wherein the humidity management system comprises:
  a condenser configured to condense water from the contaminant stream; and
  a water separator configured to separate the condensed water from the condenser.

2. The aircraft contaminant removal system of claim 1, wherein at least a portion of water from the one or more water sources is recycled to the liquid sorbent.

3. The aircraft contaminant removal system of claim 1, wherein the stripper-separator is configured to desorb the contaminant using a ram air stream as a sweep gas stream.

4. The aircraft contaminant removal system of claim 1, wherein the water sources comprise at least one of:
  the cabin air stream;
  a crown water collection system;
  a potable water storage system; and
  the liquid sorbent.

5. The aircraft contaminant removal system of claim 1, further comprising a manifold configured to:
  receive a cooled and pressurized conditioned air stream from an air conditioning system;
  receive the clean air stream from the membrane scrubber-separator; and
  control flow rates of the conditioned air stream and the clean air stream to achieve a target contaminant concentration, temperature, and pressure of the cabin.

6. An aircraft contaminant removal system comprising:
a membrane separator configured to:
  in a scrubbing mode:
    receive a cabin air stream from a cabin of an aircraft;
    absorb a contaminant from the cabin air stream into a liquid sorbent; and
    discharge a clean air stream; and
  in a stripping mode:
    receive an external air stream;
    desorb the contaminant from the liquid sorbent using the external air stream; and
    discharge the contaminant in a contaminant stream.

7. The aircraft contaminant removal system of claim 6, further comprising:
  an inlet configured to receive the cabin air stream from the cabin of the aircraft;
  an outlet configured to discharge the clean air stream to the cabin;
  an overboard inlet configured to receive the external air stream into the aircraft; and
  an overboard outlet configured to discharge the contaminant stream from the aircraft.

8. The aircraft contaminant removal system of claim 6, further comprising a dehumidifier fluidically coupled to the membrane separator and configured to:
  in the scrubbing mode:
    receive the cabin air stream as a feed gas; and
    receive the clean air stream as a sweep gas; and
  in the stripping mode:
    receive the external air stream as a feed gas; and
    receive the contaminant stream from the membrane separator as a sweep gas.

9. An aircraft contaminant removal system comprising:
a membrane scrubber-separator configured to:
  receive a cabin air stream;
  absorb a contaminant from the cabin air stream into a liquid sorbent; and
  discharge a clean air stream;
a membrane stripper-separator configured to:
  desorb the contaminant from the liquid sorbent; and
  discharge the contaminant in a contaminant stream; and
a thermal management system configured to maintain a temperature of the liquid sorbent using one or more heat exchangers fluidically coupled to an aircraft air stream.

10. The aircraft contaminant removal system of claim 9, wherein the thermal management system further comprises a heater configured to heat the liquid sorbent using a bleed air stream from an aircraft propulsion system.

11. The aircraft contaminant removal system of claim 9, wherein the thermal management system further comprises a cooler configured to cool the liquid sorbent using a ram air stream.

12. The aircraft contaminant removal system of claim 9, wherein the aircraft air stream comprises at least one of a cabin discharge stream, a ram air stream, an exhaust air stream, or a bleed air stream.

13. An aircraft contaminant removal system comprising:
a membrane scrubber-separator configured to:
  receive a cabin air stream from a cabin of an aircraft;
  absorb a contaminant from the cabin air stream into a liquid sorbent; and
  discharge a clean air stream;
a membrane stripper-separator configured to:
  desorb the contaminant from the liquid sorbent; and
  discharge the contaminant in a contaminant stream; and
a humidity management system configured to maintain a humidity of the clean air stream or a water concentration of the liquid sorbent using one or more water sources of the aircraft,
wherein at least a portion of water from the one or more water sources is recycled to the liquid sorbent.

14. An aircraft contaminant removal system comprising:
a membrane scrubber-separator configured to:
  receive a cabin air stream from a cabin of an aircraft;
  absorb a contaminant from the cabin air stream into a liquid sorbent; and
  discharge a clean air stream;
a membrane stripper-separator configured to:
  desorb the contaminant from the liquid sorbent; and
  discharge the contaminant in a contaminant stream; and
a humidity management system configured to maintain a humidity of the clean air stream or a water concentration of the liquid sorbent using one or more water sources of the aircraft,
wherein the humidity management system further comprises a water vaporizer configured to add water from the one or more water sources to at least one of:
  the clean air stream; or
  a sweep gas stream of the stripper-separator.

15. An aircraft contaminant removal system comprising:
a membrane scrubber-separator configured to:
  receive a cabin air stream from a cabin of an aircraft;
  absorb a contaminant from the cabin air stream into a liquid sorbent; and
  discharge a clean air stream;
a membrane stripper-separator configured to:
  desorb the contaminant from the liquid sorbent; and
  discharge the contaminant in a contaminant stream; and a humidity management system configured to maintain a humidity of the clean air stream or a water concentration of the liquid sorbent using one or more water sources of the aircraft,
wherein the humidity management system comprises a dehumidifier configured to return humidity from the cabin air stream to the clean air stream using the clean air stream from the scrubber-separator as a sweep gas stream.

16. The aircraft contaminant removal system of claim 15, wherein the dehumidifier is further configured to receive at least one of the cabin air stream or the contaminant stream as a feed gas stream.

17. An aircraft contaminant removal system comprising:
a membrane scrubber-separator configured to:
receive a cabin air stream from a cabin of an aircraft;
absorb a contaminant from the cabin air stream into a liquid sorbent; and
discharge a clean air stream;
a contaminant membrane stripper-separator configured to:
desorb the contaminant from the liquid sorbent; and
discharge the contaminant in a contaminant stream; and
a humidity management system configured to maintain a humidity of the clean air stream or a water concentration of the liquid sorbent using one or more water sources of the aircraft,
wherein the humidity management system further comprises a water stripper-separator configured to:
receive liquid sorbent from the contaminant stripper-separator; and
receive the clean air stream as a sweep gas stream.

18. An aircraft contaminant removal system comprising:
a membrane scrubber-separator configured to:
receive a cabin air stream from a cabin of an aircraft;
absorb a contaminant from the cabin air stream into a liquid sorbent; and
discharge a clean air stream;
a membrane stripper-separator configured to:
desorb the contaminant from the liquid sorbent using a ram air stream as a sweep gas stream; and
discharge the contaminant in a contaminant stream; and
a humidity management system configured to maintain a humidity of the clean air stream or a water concentration of the liquid sorbent using one or more water sources of the aircraft.

19. The aircraft contaminant removal system of claim 18, further comprising:
an inlet configured to receive the cabin air stream from the cabin of the aircraft;
an outlet configured to discharge the clean air stream to the cabin;
a sweep gas inlet configured to receive the ram air stream into the aircraft; and
an overboard outlet configured to discharge the contaminant stream from the aircraft.

20. An aircraft contaminant removal system comprising:
a membrane scrubber-separator configured to:
receive a cabin air stream from a cabin of an aircraft;
absorb a contaminant from the cabin air stream into a liquid sorbent; and
discharge a clean air stream;
a membrane stripper-separator configured to:
desorb the contaminant from the liquid sorbent; and
discharge the contaminant in a contaminant stream;
a humidity management system configured to maintain a humidity of the clean air stream or a water concentration of the liquid sorbent using one or more water sources of the aircraft; and
a manifold configured to:
receive a cooled and pressurized conditioned air stream from an air conditioning system;
receive the clean air stream from the membrane scrubber-separator; and
control flow rates of the conditioned air stream and the clean air stream to achieve a target contaminant concentration, temperature, and pressure of the cabin.

* * * * *